Aug. 4, 1953 G. T. RANDOL Re. 23,696

AUTOMOTIVE POWER DRIVE CONTROL SYSTEM AND MECHANISM Orig. 2,[illegible],[illegible]

Original Filed July 28, 1941 7 Sheets-Sheet 1

Inventor

Aug. 4, 1953 G. T. RANDOL Re. 23,696

AUTOMOTIVE POWER DRIVE CONTROL SYSTEM AND MECHANISM

Original Filed July 28, 1941

7 Sheets-Sheet 2

Inventor

AUTOMOTIVE POWER DRIVE CONTROL SYSTEM AND MECHANISM
Original Filed July 28, 1941 7 Sheets-Sheet 3
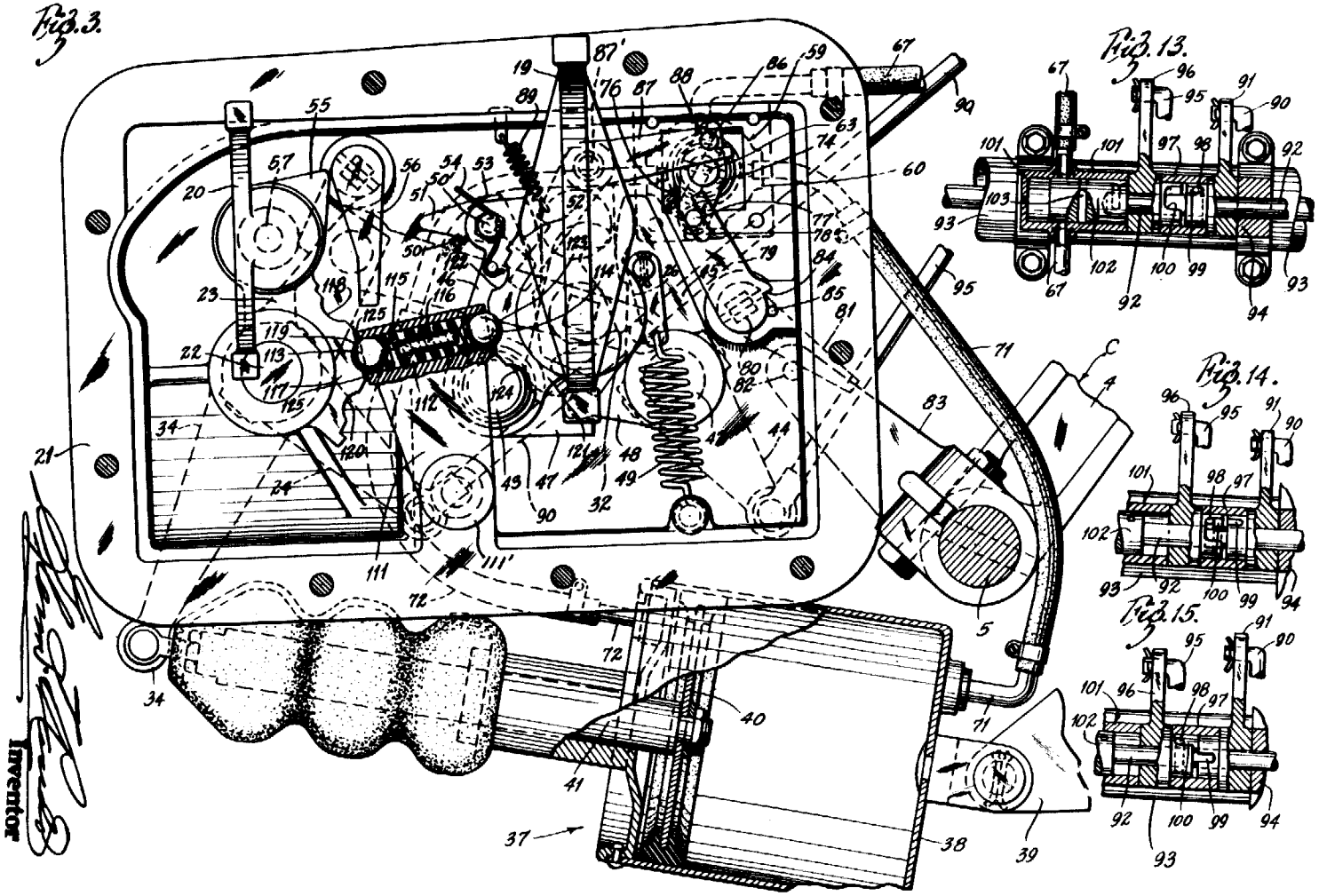

Aug. 4, 1953 G. T. RANDOL Re. 23,696
AUTOMOTIVE POWER DRIVE CONTROL SYSTEM AND MECHANISM
Original Filed July 28, 1941
7 Sheets-Sheet 4
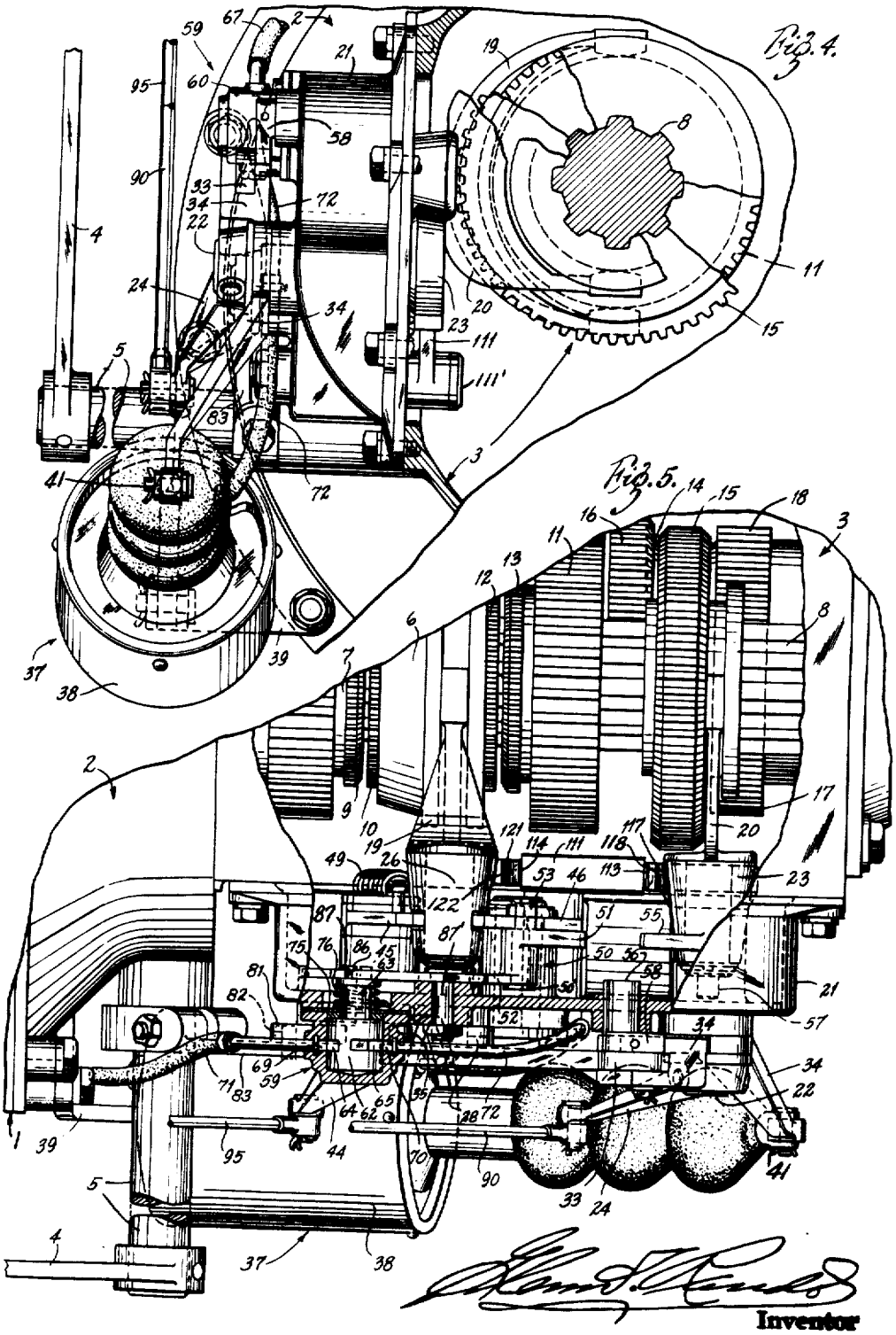
Inventor AUTOMOTIVE POWER DRIVE CONTROL SYSTEM AND MECHANISM
Original Filed July 28, 1941 7 Sheets-Sheet 5
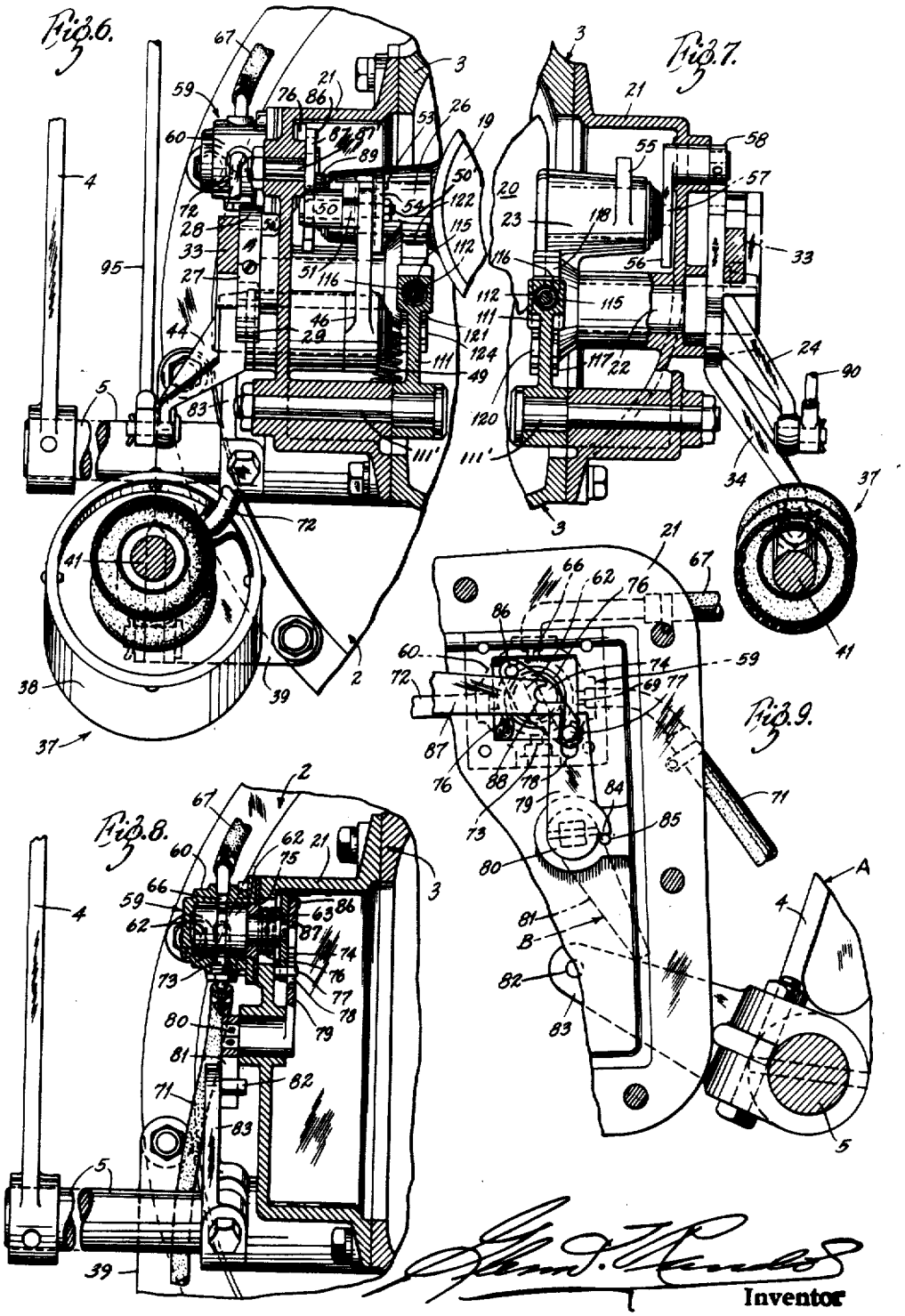

AUTOMOTIVE POWER DRIVE CONTROL SYSTEM AND MECHANISM

Original Filed July 28, 1941 7 Sheets-Sheet 6

Inventor

AUTOMOTIVE POWER DRIVE CONTROL SYSTEM AND MECHANISM

Original Filed July 28, 1941 7 Sheets-Sheet 7

Inventor

Reissued Aug. 4, 1953

Re. 23,696

UNITED STATES PATENT OFFICE 23,696

AUTOMOTIVE POWER DRIVE CONTROL SYSTEM AND MECHANISM

Glenn T. Randol, Mountain Lake Park, Md.

Original No. 2,604,963, dated July 29, 1952, Serial No. 562,075, November 6, 1944, which is a continuation of Serial No. 404,295, July 28, 1941. Application for reissue October 11, 1952, Serial No. 314,417

93 Claims. (Cl. 192—3.5)

Matter enclosed in heavy brackets [ ] appears in the original patent but forms no part of this reissue specification; matter printed in italics indicates the additions made by reissue.

This invention relates to automotive power transmissions of the stepped variable-drive type, and in particular to a novel and improved control system for activating the drives in such manner as to further simplify vehicular driving control; and the instant application constitutes a continuation of my copending earlier filed application Serial No. 404,295, filed July 28, 1941.

Numerous attempts have been made in the prior art to provide an automatic transmission wherein three forward speeds may be established after manual inauguration of the lowest of the speeds. However, in these prior art devices, an important safety factor has been eliminated by the utilization of one or more overrunning or "free-wheeling" one-way drives in the gear sets, so that it has been impossible to utilize the braking compression effect of the engine when one of the "free-wheeling" drives is effective.

Specifically, the instant invention provides improved control means for change-speed transmissions wherein at least three forward two-way drives are establishable, each of the drives when established being capable of transmitting torque when rotated in either direction.

The vehicular control and drive advantages provided by a series of two-way drives, however, do[es] not preclude the inclusion and use of one or more over-running (free-wheeling) clutches in the transmission gear train, either as a one-way vehicular drive or as a drive ineffective to transmit torque while other drives are effective for vehicular acceleration. In this latter manner, it is feasible to utilize an over-running clutch to simplify the selective control of the gear sets without the dangers inherent in conventional "free-wheeling" applications wherein the actual driving of the vehicular wheels is accomplished directly through a one-way or "free-wheeling" gear set. The present invention comprehends within its scope the use of an over-running clutch in a first speed gear set to accommodate the establishment of a higher speed gear set without necessitating the demeshing of the first gear set or the utilization of the over-running clutch to one-way drive the vehicle. At all times when said first gear set itself is effective to drive the vehicle, the over-running clutch may be rendered ineffective, so that no "free-wheeling" drive therethrough is possible or conventional two-way driving connection employed.

It is, therefore, an important object of the present invention to provide a three forward speed transmission having drive-mechanism or connections for the establishment of three forward drives, the transmission being capable of transmitting torque in either rotative direction whenever any one of the drives is established or in a one-way direction as desired.

Another object of the present invention is to provide a transmission wherein the setting of a shift lever from a first position (neutral) to a second position (high range) operatively releases a governing means for subsequent operation under the control of a selectively operable pedal for automatic shifting operation between two or three forward speeds without further actuation of the shift lever.

An object related to that last stated is the provision of selective speed drive control means to render initially effective, for example, as in starting a vehicle, either a first or a second speed drive of the three aforesaid successive speeds without disturbing the second position setting of the lever.

Another related object to that hereinbefore set forth is to provide a third position (low) for the manually-operated member wherein the first of said three speeds may be utilized indefinitely for driving the vehicle, irrespective of the selective operative condition of the pedal.

A further object related to those hereinbefore set forth is the provision of novel means, controllable at will by the shift lever when returned from either the aforesaid second or third positions to first position, to cause whatever speed is effective to drive the vehicle to be rendered ineffective to transmit driving torque.

A still further important object of the invention is to provide novel transmission control means whereby rendering operative the first speed drive of a series of three two-way speed drives coincidentally conditions for later stepped sequential shifting operation all three of the series of speeds or only two thereof.

An additional important object of the present invention is the provision of a transmission control having operating means responsive to actuation of a power means, for changing the effective drives of the transmission; and means for energizing said power means including shift regulating mechanism responsive to movement of a shift lever; and a power control means responsive to movement of a control pedal, the cooperation of the last two mentioned means causing operation of the power means to change the transmission drives.

A further related object to that next above is the provision of operating means wherein the shift lever-responsive regulating mechanism is operable independently of the pedal-responsive means to establish one of a plurality of speed drives, and the pedal-responsive means is operable independently of the lever-responsive means after the one of the drives has been established to establish a second of said speed drives.

Yet another important object is the provision of means for selectively obtaining a successive power shift through either two or three *forward* speed drives following the positioning of a shift lever in a predetermined position, the means including mechanism responsive to a prior movement of the shift lever from a previous setting in its predetermined position and also responsive to a subsequent re-setting of the shift lever into its predetermined position, the selection of the specific power shift being determined by the extent of movement of a control pedal.

A still further important object of the present invention is to provide a three forward speed two-way drive transmission having shift-operating means manually movable through a shift lever to actuate a first shifting mechanism for establishing one of the drives, a second shifting mechanism movable to establish a second and a third of the drives, and means to lock the second mechanism against movement until the shift lever has been moved to establish said one of the drives.

A related object to that next above is the provision of means *actuatable* [actuable] after the shift lever has been placed in a drive operative position to establish low speed drive, and only then to accommodate movement of a shifting mechanism for the establishment of intermediate and high speed drives.

Among further important objects of the present invention is the provision of improved control means for a three forward speeds and one reverse change-speed transmission whereby the forward speed-changes from the lowest to the highest speed, and then alternately between the next lower speed and the highest, may be accomplished automatically upon the establishment of the lowest speed solely by means controlled by a movement of an operator-operated member and without imparting additional movement to said member while so moved.

Another object is to provide a control means in which a manually established forward speed may be automatically neutralized and two other different forward speeds alternately established automatically without any additional manual operation of the manual member employed to establish the first speed.

An object related to that last stated is to provide in a control means of the kind referred to, means whereby the manual member employed to establish the one speed may also be employed at will to neutralize the one speed or either of the two other speeds when established after said manual control member has established the one speed.

A still further object of my invention is to provide an improved control means for a change-speed transmission having three different forward speeds, which functions in such manner that the vehicle may be started in the lowest speed or the next to highest speed as a result of a single setting of a manually-controlled shift lever.

Another object of my invention is to so construct a control means of the type above referred to, that after said transmission is caused to be in the highest speed, the second and highest speeds may be alternately obtained by successive operations of a pedally-controlled member such as, for example, the usual clutch pedal or accelerator mechanism if the engine friction clutch is so controlled *by the latter*, said pedally-controlled member being employed in causing automatic changing of the speeds from the lowest to the highest, and then alternately between the second speed and the highest speed.

Still another object of my invention is to incorporate into said control means, means for accommodating the change-speed transmission to be placed in neutral condition at will by a movement of the hand-controlled lever to a predetermined position.

Still another object of my invention is to provide a control means for a change-speed transmission having three forward speeds wherein the low speed may be manually engaged and a shift-limiting means released by the movement of a hand-lever to a predetermined position, and then the second (intermediate) and high speeds alternately obtained automatically by successive movements of a pedally-controlled member, and without any additional manual movement of the hand-lever, said control means also being so arranged that after said high speed is obtained, continued successive movements of the pedally-controlled member will result in intermediate and high speeds being obtained alternately.

A still further object of my invention is to provide improved control mechanism for a change-speed transmission having three forward speeds, and wherein the movements of a hand-operated gear shifting lever from a gear ratio operative position to an inoperative position and return will cause the lowest speed to be established at will, irrespective of which speed is established prior to such lever movements.

Still another important object of my invention is to embody in control means of the kind referred to, fluid-pressure energized servomotor means for performing the speed-changing operations in the manner described, and to control said means by correlated personal and speed drive governing operations.

Yet another object of my invention is to incorporate into the control means, spring means which is so constructed that it will function to automatically assist the hand-lever in neutralizing the transmission after said lever is initially moved from an active speed position toward its neutral position, and when the lever is in its position wherein a gear ratio may be active, said spring means will be effective to hold the elements comprising the control means in their operated positions to accommodate gear ratio changing.

A more specific object of my invention is to provide an improved control means for a conventional three speeds forward and reverse change-speed transmission which will simplify the speed-changing operations by eliminating many movements of the hand-lever previously required, and yet the operator may obtain the speed he desires at the time he desires it, thus enabling him to properly control the engine performance in accordance with the vehicle load and/or road conditions imposed thereon.

Another object of my invention is to provide an improved control means for a change-speed transmission which will simplify vehicular driving, which is inexpensive to manufacture, and which is so constructed that it can be readily associated with existing transmissions with a minimum of alterations.

A further and important object of my invention is to provide an improved control means for a change-speed transmission having at least three forward speeds and associated with a torque-transmitting coupling (friction clutch) operable for interrupting the power-torque therethrough, and wherein said speed-changing and torque-interrupting are effectual through a pedal movable between a first and a second position, said first position being effectual to cause torque interruption and establishment of a selected speed, and wherein movement of the pedal to its second position causes an automatic resetting of the speed-changing mechanism such that upon return of the pedal to its first position said mechanism will function following torque interruption to establish a newly selected speed.

Another important object related to that last stated is to provide improved pedally-controlled speed-changing mechanism wherein the pedal-operated member is effectual when moved from the first position to the predetermined second position and returned to cause said mechanism to change speeds.

Still another important object is to provide an improved control for three forward speed-changing wherein a hand-operated shift lever is movable from a neutral position common to all speeds of the transmission to another predetermined position to release a shift-governing means and to establish, solely by manual effort, one of the speeds and capable of assuming another supplemental (third) position different from the predetermined position and without return to the neutral position to thereby condition for operation ensuing speed changes between the other two speeds upon manipulation of a foot-operated member from a first position to a predetermined second position and return.

Another object is to provide an improved control mechanism for effecting a series of forward speed changes in such manner that after the lowest speed of the series has been made operative by movement of a pedally-controlled member to a first position, the next higher speed may be made operative and the lowest speed inoperative solely by movement of the pedal to a second predetermined position and return.

A further object is to provide a manually-operated means for effecting certain forward speed drives of a change-speed gear system controllable by a pedal member movable from a first position to a predetermined position to thereby inaugurate power operations, and whereby subsequent reciprocatory movement of the pedal member is necessary for changing of the speeds by motor power operations.

Another important object is to provide an improved vehicular power drive control system for effecting a series of forward speed drives controllable by a member movable from a first position to a second position, and wherein said control member when in its first position causes a certain speed to be effective, but to effect a new speed thereby requires that the control member be moved to its second position and return, thus insuring that an established speed will be employed in driving the vehicle before a new speed is used or made effective.

Another object is to provide in transmission gear control means a pedally-controlled member movable to a first position for causing a prime mover friction clutch to be disengaged, and controlling the effecting of gear ratio changing operations following the movement of the said control member to a second position beyond the said first clutch-disengaged position.

A still further object of the invention is to provide improved control means for a change-speed transmission having at least three forward speeds, and operable in such manner that an operator may manually establish the lowest of the speeds and release a shift-inhibiting means by moving a manual member from one position to another, and then by operation of servo-mechanism under the control of a pedal member, made effective only after release of the inhibiting means, to neutralize the said established speed and selectively establish the other two speeds without return movement of the manual member to its said one position, said pedal member having a first position for interrupting the transmitting of drive torque from a power source through the change-speed transmission, and a second position from which the member is returned will cause one of said other two speeds to be established.

An additional important object of the instant invention is to provide an improved control mechanism for a change-speed gear transmission wherein one speed drive is manually established by movement of a gear-shift lever and then neutralized by power means which controls additional speed drives, the shift lever being undisturbed by functioning of the power means, and the shift lever being movable in one direction to release a shift-inhibiting mechanism and to control the establishment of the first speed drive, and thereafter manually movable in a different direction for selectively causing other speed drives to become operative.

Another object related to that immediately heretofore set forth is to provide novel control means for a change-speed gear transmission wherein a manually-operated shift-lever is utilized as a control element for selectively causing the establishing of a plurality of different forward and a reverse speed gear ratio, the shift-lever being movable in one direction to render inoperative a shift-restricting means and to cause establishment of one forward gear ratio, being movable in a different direction to cause establishment of a different forward gear ratio, and also being movable in a direction opposite to the direction of movement of the shift-lever to cause establishment of the first gear ratio to establish said reverse gear ratio.

An additional salient object is the provision of a novel transmission control means including a selector-lever movable from a neutral position to a pair of forward drive control positions at *one* [each] of which a low speed drive is [activated] *activatable* manually *inactivatable* [inactivated], and then manually by return movement of the selector-lever to neutral position from said one of the pair of drive positions, or *said low speed drive may be inactivated* by a *fluid-pressure responsive* servo-mechanism [while] *upon* the selector-lever [occupies] *being moved to* the other of said pair of drive positions; with reinstatement of the low speed drive requiring a cyclic return movement of the selector-lever through its neutral position and thence to [either] *said one* of said pair of drive control positions.

A further and important object of the invention related to the object immediately preceding, is the provision of novel control means for automotive change-speed drive mechanisms comprising at least a low speed forward drive and two higher speed forward drives, whereby movement of a manual selector from a common neutral position to a first drive controlling position causes low speed drive to be activated with simultaneous inhibition of power-transition to either of the two higher speed drives; said manual selector being also provided with a second drive controlling position with movement thereto from said first drive position effecting power-transition from low speed drive to the next higher speed drive and thence, to the highest speed drive and alternately thereafter between said two higher speed drives, all in response to a servo speed-selector influenced by normally operating a vehicular control pedal with the manual selector in second drive position.

Other objects of my invention will become apparent from the following description taken in connection with the accompanying drawings, in which:

Figure 3 is a view similar to Figure 2 showing the shifting control parts on the inside of the closure plate, said parts corresponding to neutral condition of the gearing;

Figure 4 is a rear end view of the control mechanism of the transmission;

Figure 5 is a top view of the gearing and control mechanism with the shiftable elements of the gearing in neutral position;

Figure 6 is a sectional view taken on line 6—6 of Figure 2;

Figure 7 is a sectional view taken on line 7—7 of Figure 2;

Figure 8 is a sectional view taken on line 8—8 of Figure 2;

Figure 9 is a view showing the shift-control valve moved to its gear-shifting position with the control pedal in clutch-engaged position;

Figure 10 is a longitudinal sectional view taken on line 10—10 of Figure 1 and showing details of the control shaft operated shifting arms and associated shift-selector valve;

Figure 11 is a transverse sectional view taken on the line 11—11 of Figure 1 of the shift-selector;

Figure 12 is a sectional view similar to Figure 11 but showing the hand-controlled selector valve operated to open position corresponding to the positions of the shift-controlling parts as shown in Figure 13;

Figure 13 is a sectional view similar to Figure 10 but showing the selector valve and associated shifting arms operated to establish low gear drive in the gearing;

Figure 14 is a fragmentary sectional view similar to Figure 13 but showing the positions of the selector valve and associated shifting arms with second and high gear selected;

Figure 15 is another sectional view similar to Figure 14 but showing the positions of the selector valve and associated shifting arms when either second or high gear drive is established;

Figure 1:
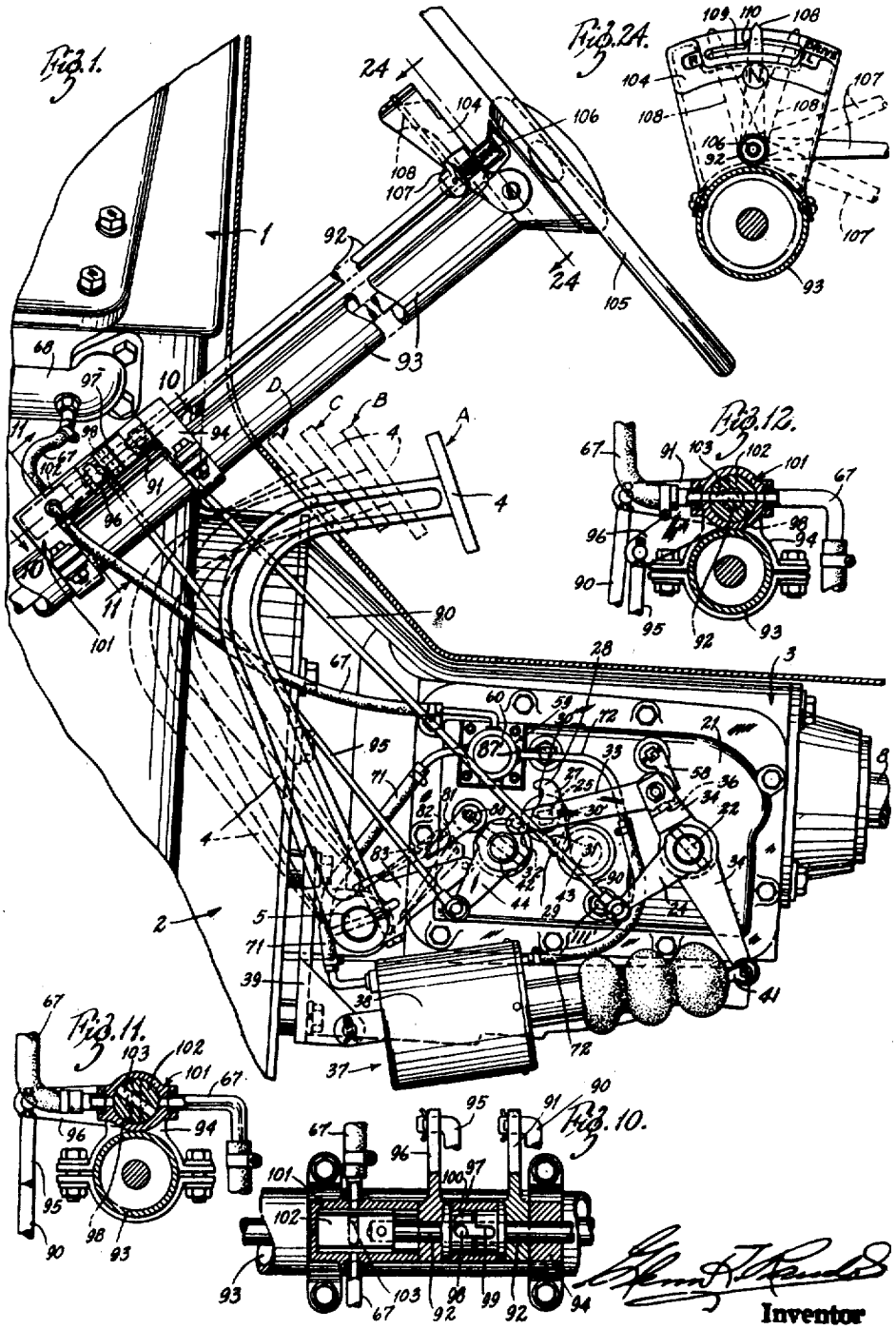
Figure 1 is a side view of a portion of a motor vehicle including a change-speed transmission showing a control mechanism associated therewith and embodying my invention, the parts being in neutral position and the clutch and transmission control pedal in fully clutch-engaged position.
Figure 25:
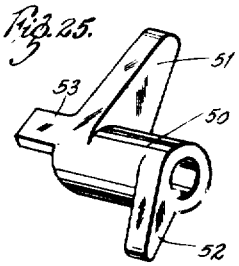

Figure 24 is a view taken on the line 24—24 of Figure 1 showing the hand-controlled shifting lever and associated indicating bracket as mounted on the steering column of the motor vehicle; and Figure 25 is a perspective view of the limiting pawl effective for inhibiting [the release of] the shifter valve controlling mechanism [so that] *from actuating* said valve [may be controlled], the pawl thus forming an element of the low speed drive limiting governing means.

Referring to the drawings and particularly to Figures 1 and 5, the numeral 1 indicates an internal-combustion engine for driving a motor vehicle, this engine being coupled to the driving wheels of the vehicle by means of a torque-transmitting coupling which is depicted specifically and solely for purposes of illustration as a conventional pedally-controlled friction clutch enclosed within an engine flywheel housing 2 suitably closed by a forwardly extending bell-shaped housing portion of a change-speed transmission enclosed within a housing 3. The transmission is specifically illustrated, by way of example, as a synchro-mesh sliding gear type having three forward and one reverse speed drives connected through suitable shafting and differential gearing to the vehicle wheels, as is the usual practice.

The torque-transmitting coupling, the transmission, and the transmission-wheel connection constitute a vehicular power train for the conveyance of driving power from the vehicle engine to the vehicle wheels. The illustrated specific components of this vehicular power train are exemplary only, and therefore, the invention inherently accommodates the utilization in the general combination, of all such components recognized in the art as coming within the range of equivalents in the patent sense. Also, the transmission in and of itself constitutes a power train providing a plurality of multi-directional drive connections and preferably providing three forward speed drives and one reverse speed drive.

A clutch or control pedal 4 secured to the outer end of a shaft 5 journalled transversely in housing 2 controls, by way of example, the engaging and disengaging of the clutch and certain speed-changing functions of the transmission. This pedal 4 has differing ranges of operating movement between two extremes for effecting the aforesaid correlated clutch and speed-changing functions. Such clutching operations may be effected alternately by accelerator-controlled power-operated means such as, for example, a vacuum-operated unit of conventional construction. Therefore, any type of power means employed to operate shaft 5 in the manner stated in lieu of the pedal 4, which as illustrated in Figure 1 has an operating range of movement defined by extreme positions, is considered a reasonable equivalent in a patent sense. The extreme positions of the control pedal 4 are denoted by reference characters "A" and "D" indicating a fully released position and a fully depressed position, respectively. The pedal 4 is also movable in operating increments between its extreme positions. Such incremental movements are indicated by reference characters "B" and "C" from either extreme or defined thereby.

The specifically illustrated change-speed gearing within the housing 3, as aforesaid, is of conventional design comprising three forward speeds and one reverse speed. A portion of this gearing is shown in Figure 5 and comprises a shiftable clutch element 6 which, when shifted to the left from the neutral position shown, will cause a driving shaft 7 of the gearing to be connected to a driven shaft 8 of the gearing by means of co-operating clutch teeth 9 and 10 rotatable with the named shafts, respectively. When this clutch element is shifted to the right, as shown in Figure 5, it will cause the second (intermediate) speed to be rendered operative by connecting the second speed gear 11 to the driven shaft 8 by means of clutch teeth 12 and 13. The second speed gear is driven from the driving shaft 7 by way of the countershaft 14, the meshing gear thereon not being shown. The low and reverse speeds are obtained by a slidable gear 15 splined on the driven shaft 8. This gear, when moved to the left from its neutral position as shown in Figure 5, engages with gear 16 to obtain low speed, and when moved to the right from its neutral position, engages an idler gear 17 driven by a gear 18 on the countershaft to thus obtain reverse gear. The shiftable clutch element 6 is moved by a shifting fork 19 and the slidable gear 15 is moved by a shifting fork 20. The clutch teeth 9 and 10 and clutch teeth 12 and 13 have associated therewith the usual synchronizing means (not shown).

In accordance with my invention, I have provided improved means for operating the slidable clutch element 6 and the combined low and reverse gear 15 in order to properly control the change of gear ratios of the transmission. On the side closure plate 21 for the gear housing 3 there is journaled a shaft 22 carrying on its inner end an arm 23 to which is pivoted in the free end thereof the shifting fork 20. The exterior free end of the shaft 22 has secured thereon an arm 24 for actuating the shaft and for manually controlling the shifting fork 20 from a remote point by structure to be later described. When the arm 24, as viewed from the exterior of the closure plate, is moved in a clockwise direction from its neutral position shown in Figures 1, 2 and 5, the shifting fork 20 will cause the gear 15 to engage the idler gear 17 for activating reverse speed drive. When the arm 24 is moved in a counter-clockwise direction from neutral position, the shifting fork will move the gear 15 into mesh with gear 16 to obtain low speed drive.

Figure 23:
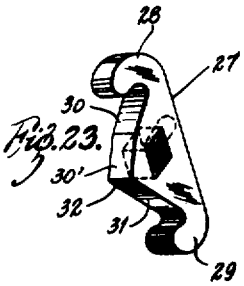
Figure 23 is a perspective view of the double arm lever forming an element of the intermediate and high speed driven selective governing means.

Also journaled in the closure plate 21 at a point forwardly of shaft 22 is a second shaft 25, and secured to the inner end thereof is an upwardly extending arm 26 which has pivotally mounted in its upper end the shifting fork 19 for the shiftable clutch element 6. When the shaft 25 is rotated in a counter-clockwise direction from its neutral position, the clutch element 6 will be moved to engage the teeth 9 and 10 and cause high speed drive to be rendered operative, and when moved in a clockwise direction from neutral position, the shiftable clutch element 6 will engage teeth 12 and 13 to cause second speed drive to be rendered operative. On the outer end of the shaft 25 is secured a double arm lever 27, shown in perspective in Figure 23, for rotating this shaft in opposite directions. This double-arm lever has hooked portions 28 and 29 on opposite sides of the axis of the shaft, and converging from these hooked portions are cam surfaces 30, 30' and 31, said surfaces 30' and 31 converging at an apex 32 to form a V-shaped selecting cam or drive governing means.

Figure 2:
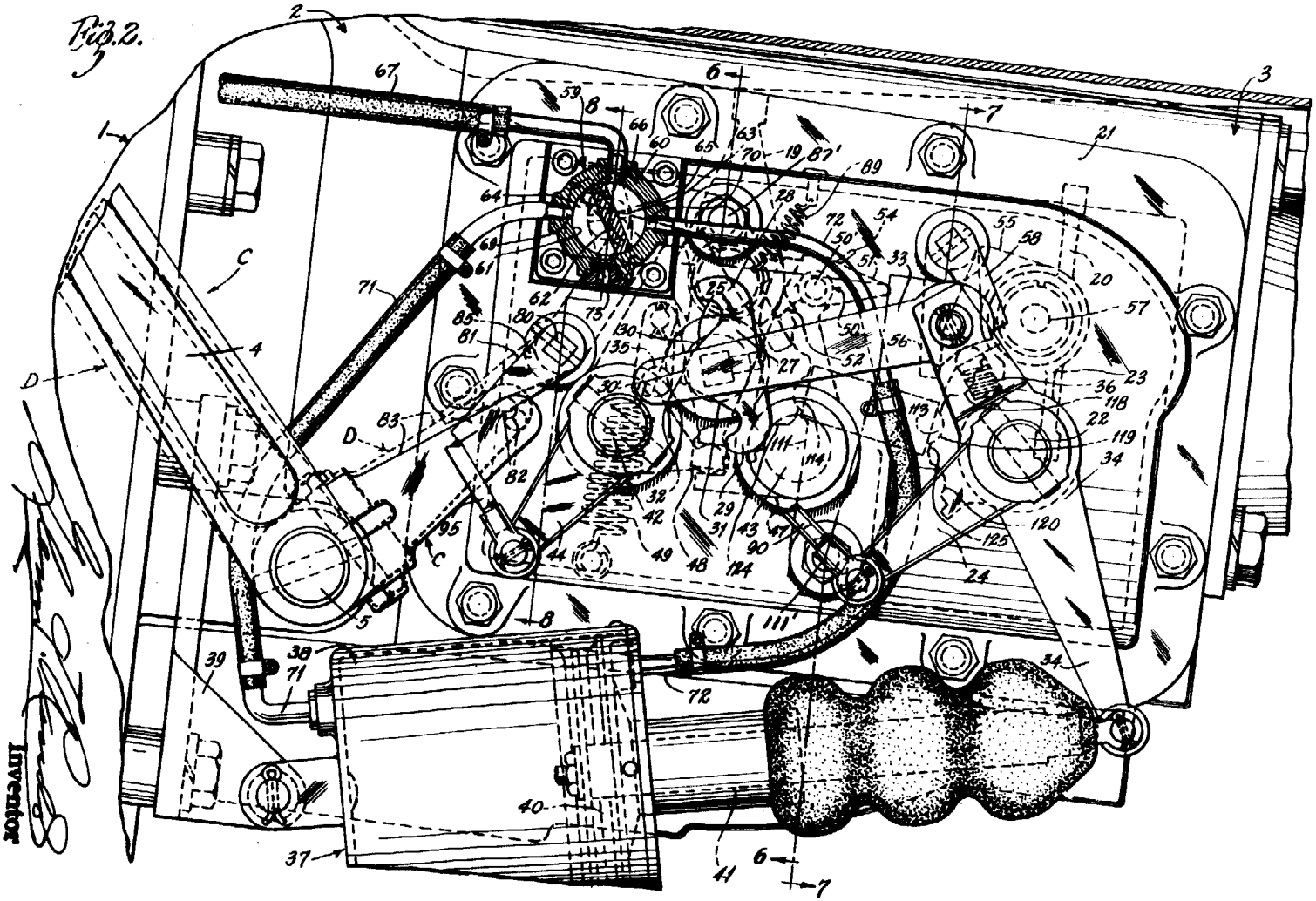
Figure 2 is an enlarged view similar to Figure 1 with the clutch pedal moved to clutch-disengaged position.
Figure 22:
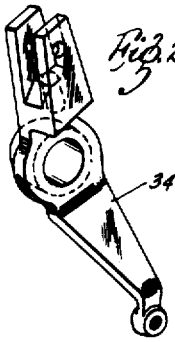
Figure 22 is a perspective view of the shifting arm actuated by the motor power device.

The means employed for operating the double-arm lever 27 comprises a link 33 pivotally mounted to the upper end of a lever 34 which is rotatably journaled intermediate its ends on the shaft 22 previously referred to. The lever 34 is shown in perspective in Figure 22. The free end of link 33 carries a pin 35 for selectively engaging either the hooked portion 28 or the hooked portion 29 of the double-arm lever 27, depending upon the position of the apex 32; but due to the surface 30' always lying slightly below the center of the pin 35 when in the neutral position with respect to intermediate and high speed drives, as shown in Figures 1 and 2, the initial servo-operation will activate intermediate (second) speed prior to high speed. The link 33 is biased to a predetermined position by a spring-operated detent 36 to yieldably hold the pin 35 in proper alignment with the apex 32. The V-shaped cam comprising the structure 30—30'—31—32 forms my novel selecting means of a drive governing means for the servo-controlled speed drives; namely, intermediate and high (direct) speed drives. The speed drive governing means, to be hereinafter fully described, predetermines the activation of either three forward upshifted speed changes or alternations between the two higher speed drives according to correlated operator control.

The lever 34 is adapted to be actuated by fluid-pressure power means shown, by way of example, as a vacuum-operated servomotor 37 comprising a cylinder 38 pivotally mounted on the clutch housing by a bracket 39 and an energizable piston 40 provided with a piston rod 41 *operably* connected to the lower end of said lever 34. This speed-changing motor, when operably energized, is capable of rendering low speed inoperative under certain operator-controlled conditions, as after said speed has first been caused to be established by manually-controlled means. As a consequence of operation of the aforesaid selecting means, second (intermediate) and high speed drives are rendered alternately operative upon energization of the servo-mechanism, as will hereinafter become apparent from the description to follow.

When the piston 40 of the servomotor 37 is at the rear end of the cylinder 38, the lever 34 and the link 33 will be so positioned that the pin 35 on the link will lie forwardly of the apex 32 of the double-arm lever 27, and when the piston is moved to the forward end of the cylinder 38, the double-arm lever 27 will be caused to be rotated in either a clockwise direction or a counter-clockwise direction, depending upon the position of the apex 32 relative to the central (neutral) position thereof. Since the apex 32 normally lies below the longitudinal axis of the pin 35, this pin will ride up the surfaces 30' and 30 and enter the hooked portion 28 to rotate the lever 27 and the shaft 25 in a clockwise direction to thus initially cause the intermediate speed drive to be rendered operative, which movement will position the apex 32 above the axis of the pin 35. Subsequent retraction of the link 33 will cause the pin 35 to be guided by surface 31 into the hooked portion 29 of lever 27, and thus cause movement of shaft 25 in a counter-clockwise direction to cause high speed to be rendered operative. The detent 36 yieldably accommodates pivotal movement of the link 33 for selective engagement with the two hooked portions 28—29 of the double-arm lever 27, and the detent also biases the link 33, during retraction thereof, to its predetermined normal reset position (shown in Figure 2) by the resetting movement of the servomotor 37 whenever the piston 40 is at the rear end of the cylinder. Thus, the intermediate and high speed selecting mechanism comprises the structure indicated by reference numerals 30—32 inclusive.

On the cover plate below the shaft 25 and in spaced-apart relation, are two additional shafts 42 and 43. The exterior of the shaft 42 has secured thereto an arm 44 which is adapted to be manually actuated from a remote point by structure to be later referred to. Secured respectively to the inner ends of the shafts 42 and 43 are two upstanding neutralizing levers 45 and 46 which are connected for simultaneous rotational movement by interlocking arms 48 and 47, respectively. The levers 45, 46 extend upwardly from the shafts 42, 43, respectively, to lie on opposite sides of the arm 26 which carries the shifting fork 19. When the levers 45, 46 are moved toward one another, they will cause the arm 26 and the shifting fork 19 to assume a central or neutral position at which neither the intermediate nor the high speed drive is operative. When the levers 45, 46 are spread apart, the shifting fork 19 will be free to be moved in either direction in order to selectively cause second (intermediate) or high speed drives to be rendered operative.

The lever 45, which is operated by the exterior arm 44, has associated therewith an over-center spring 49 connected at one end to the lever 45 and at the other end to the casing 21 on the opposite side of the shaft 42. Thus, if lever 45 is moved to a position at which the shifting fork 19 is in its neutral position, the line of effective pull of the spring 49 will be such as to hold this lever 45 (also lever 46) in a position corresponding to the neutral position of the shifting fork arm 26. If lever 45 is swung away from the shifting fork 19, the line of pull will be on the opposite side of the axis of the lever 45 to hold lever 45 (also lever 46) in a position spaced from the neutral position of the shifting fork arm 26. The spring arrangement is not only effective for holding the neutralizing levers 45 and 46 in their extreme outwardly spaced positions, but is also effective to assist manual effort in neutralizing both the intermediate and the high speed drives, as will be later apparent.

The upper end of the lever 46 has pivotally mounted thereon a pawl generally indicated at 50 and shown in detail in Figure 25. This pawl 50 is pivotally mounted on a pin 50' extending laterally from the upper end of the neutralizing lever 46, and the pawl is composed of a rearwardly projecting portion 51 and a downwardly projecting portion 52 axially spaced from the projection 51. There is also provided on the pawl 50 a stop 53 which is adapted to engage the top of the lever 46 in order to limit the rotation of the pawl 50 in a clockwise direction on said lever 46, as viewed from the inside of closure plate 21 (Figure 3). A spring 54 carried by the lever 46 and cooperating with the stop 53 normally biases the pawl 50 to a position wherein the stop 53 engages the top of the lever 46. The projection 51 on the pawl 50 is adapted, under certain conditions, to be engaged by a projection 55 integral with the upper end of arm 23 to which the low and reverse gear-shifting fork 20 is pivoted. The projection 55 is adapted to engage the projection 51 of the pawl 50 only when lever 46 is positioned inwardly and the shifting fork 20 is in a position to cause low speed to be operative under certain operator-controlled conditions which will hereinafter be more fully described.

Pivotally mounted in the closure plate 21 and positioned on the inner side thereof is an arm 56. The arm 56 is adapted to engage a pin 57 carried by the inner end of the bearing portion of the shifting fork 20 in order to move the shifting fork 20 from a position where gear 15 is in low speed to a position where the gear is disengaged. The arm 56 is actuated from the exterior of the closure plate 21 by an arm 58 adapted to be engaged by the upper end of the lever 34 when the same is actuated by the piston of the suction motor 37. Thus, as viewed in Figure 2, if the shifting fork 20 should be in the position wherein the low speed gear ratio is operative, this gear ratio will be rendered inoperative whenever the piston 40 of the servomotor is actuated through a portion of its travel from the rear end of the cylinder toward the forward end, i. e., from right to left as illustrated.

A shift-control valve 59 for the servomotor 37 is positioned on the exterior of the cover plate at the upper forward end thereof and has two open motor operating positions as shown in Figures 2 and 9. This control valve 59 comprises a casing 60 having a transverse interior cylindrical chamber 61 in which is mounted a cylindrical valve element 62 provided with an actuating shaft 63 projecting into the interior of the cover plate 21. The valve element is provided with cross slots 64 and 65 in order to properly direct the flow of fluid through the valve to the servomotor 37. The upper part of the valve casing 60 is provided with a first port 66 which is connected by a conduit 67 to a source of pressure-fluid shown, by way of example, as an inlet manifold 68 of the engine 1. The valve casing is also provided with diametrically opposed second and third ports 69 and 70, respectively. The second port 69 is connected by a conduit 71 to the forward end of the cylinder 38 of the motor 37 and the third port 70 is connected by a conduit 72 to the rear end of the cylinder 38 of the motor 37. The lower part of the casing 60 is provided with an atmospheric port 73 diametrically opposing the engine intake manifold port 66. By this structure it is seen that, when the valve element 62 is positioned as shown in Figure 2, the slot 65 will place the rear end of the servomotor 37 in communication with the manifold 68 and the slot 64 will place the forward end of the servomotor 37 in communication with the atmosphere. If the valve element 62 is turned clockwise substantially 60 degrees, the rear end of the servomotor 37 will be connected to the atmosphere and the forward end of the servomotor 37 will be connected to the manifold 68. Thus, by oscillating the valve elements 62, the piston *rod* 41 of the servomotor 37 can be caused to reciprocate in its cylinder 38.

The inner end of the shaft 63 of the shift-control valve element 62 carries a lever 74 whereby the valve element can be actuated. Between this lever 74 and a fixed plate 75, retaining the valve element 62 in the casing chamber 61, there is interposed a coil spring 76, one end of which is fixed to the plate 75 and the other end of which is connected to the lever 74 by a pin 77 (Figure 8). This pin 77 projects into a slot 78 in the end of the lever 79 pivoted on a shaft 80 in the forward (left) end of closure plate 21. The outer end of this shaft 80 has secured thereto a downwardly extending arm 81 which is adapted to be engaged by a pin 82 on an arm 83 which is secured to the clutch shaft 5 and movable with the shaft 5 each time the clutch is actuated. When the clutch is in engaged position, the pin 82 is spaced from the arm 81 a sufficient distance to accommodate clutch disengagement by depressing the clutch pedal 4. The spring 76 biases the valve element 62 to a position wherein the left end of the motor 37 is placed in communication with the manifold 68 (Figure 9). In this position of the valve element, the lever 79 will have its shoulder 84 on the hub of the shaft 80 engaged with a stop 85. When the arm 81 is engaged by the pin 82 and actuated by the clutch pedal 4, the valve element 62 is rotated in a clockwise direction to the position shown in Figure 2.

The upper arm of the lever 74, carried by the valve element shaft 63, carries a laterally extending pin 86 (best shown in Figures 3 and 9) which is adapted to cooperate with a lateral arm of a bell-crank lever 87 medially pivoted to the inside of the closure plate 21 on a pin 87' laterally extending therefrom. The lever 87 is provided with a notch 88 which is registrable with the pin 86 for engagement thereby through the action of the spring 76 on the valve lever 74 to prevent downward movement of the lever 87, as viewed in Figure 3, as long as the pin 86 remains in the notch, which will be the case when the gearing is in a neutral or reverse condition. However, when the pin 86 is moved out of the notch 88 by rotation of the lever 74 in a clockwise direction (as viewed from the inside of the cover plate) the lever 87 is released to freely move downwardly, which movement is brought about by a spring 89 connected to the other depending arm of the bell-crank lever 87. Rotation of the lever 74 is conditioned by adjusting the pedal 4 to its "D" extreme position while the shift lever 107 occupies either its "L" or "Drive-Range" position. When the pin 86 is engaged in the notch 88, the valve element 62 will be held in its operative position shown in Figures 2 and 3 wherein the rear (right) end of the motor 37 is placed in communication with the intake manifold 68. It is thus seen that the bell-crank lever 87 prevents rotation of the valve element 62 to its other operative position under the influence of the spring 76 while the shift-lever 107 occupies either neutral or reverse position.

The rear depending arm of bell-crank lever 87 extends to a position wherein it can cooperate with the projection 52 carried by the pawl 50 previously described and pivotally mounted on the upper end of lever 46. When the lever 46 is in its innermost position, the projection 52 will prevent any movement of the bell-crank lever 87 by the spring 89 notwithstanding the pin 86 is disengaged from the notch 88. If the projection 51 on the pawl 50 is engaged by the projection 55 in the manner already described, the pawl 50 will be rotated on the lever 46 and the projection 52 will assume a position such that the bell-crank lever 87 is released for rotation by the spring 89 upon disengagement of the pin 86 and notch 88 by depressing the clutch pedal to extreme position "D".

The pawl 50, together with the spring-biased bell-crank lever 87 and the manner in which such elements control the valve element 62 according to selective operator control, comprises novel limiting means of the aforementioned speed drive governing means whereby the operation of the servo-mechanism is inhibited to insure vehicular acceleration in low speed drive in the "Drive-Range" position only of the shift-lever 107, as will hereinafter be fully described. The servo-mechanism cannot be energized until the arm 23 engages the low speed gears and results in projection 55 moving the pawl 50 so that the bell-crank lever 87 is released for movement by the spring 89 to the position shown in Figures 9 and 21. This limiting means can also be considered as a mechanical form of low speed control means. The limiting or inhibiting means is released to be rendered ineffective prior to actuation of the motor 37 by the conditioning operation of rendering active low speed drive. Thus, there can be said to be incorporated in the control mechanism two controlling or governing means for the power-shifting means; namely, the limiting mechanism 50—54 and 86—89, inclusive, and the selective mechanism including the structural elements 30—32, inclusive, which comprise the aforementioned three speeds forward drive governing means.

The manual shifting means for moving arms 24 and 44 on the exterior of the closure plate will now be described. As best shown in Figure 1, the arm 24 (for controlling the low speed gear) is connected by a link 90 to a shifter arm 91 loosely mounted on a rotatable and reciprocable gear shift control shaft 92 extending parallel to the steering column 93 and journaled in a bottom bracket 94 clamped thereon. The other arm 44 (for controlling the intermediate and high speed gearing) is connected by a rod 95 to a shifter arm 96 also loosely mounted on the shaft 92. The shifter arms 91 and 96 are held in spaced relation by a sleeve 97 interposed therebetween. The shaft 92 is adapted to be selectively connected to the arms 91 and 96 by means of a cross-pin 98 carried by the shaft and cooperating with slots (notches) 99 and 100 in the hubs of said shifter arms 91 and 96, respectively. The notch 99 in the hub of the arm 91 is only of sufficient width to receive the pin 98, but the notch 100 in the hub of arm 96 is of greater width than the pin 98. Below the arm 96 is a selector valve housing 101 secured to the steering column and within this housing is a cylindrical selector valve element 102 which is secured to the lower end of the shaft 92 for rotation therewith. The valve casing 101 is interposed in the conduit 67 which connects the shift-control valve 59 with the intake manifold 68, and the valve element 102 is provided with a cross passage 103 which in one position is aligned with the conduit 67 and in the other positions is effective to cut off communication through said conduit 67. The valve element 102 is operably connected to reciprocate and rotate with the gear shift control shaft 92 to a plurality of operative or control positions, including closed and open positions, but the shaft must be in its lower position to place the cross passage 103 in registry with the conduit 67 for conditioning the control means to cause ensuing power shifting operations which will hereinafter become apparent.

The upper end of the shift control shaft 92 is journaled in a bracket 104 secured to the upper end of the steering column below a steering wheel 105. A spring 106 normally biases this shaft to its lower position. Secured to the shaft is a manually movable shift or selector-lever 107 for rotating and axially reciprocating the shaft, this lever extending outwardly to the right of the steering column and below the steering wheel. Associated with lever 107 is a pointer 108 which extends upwardly and through an irregular slot 109 in the outer end of the bracket 104. The bracket 104 carries indicia shown as "R," "N," "L" and "Drive." The letter "N," indicating neutral, is at the center of the slot; the letter "L," indicating low or first speed drive, is at the upper right end of the slot; the word "Drive" (drive range—low, intermediate and high speeds) is at the lower right end of the slot, all as viewed behind the steering wheel. The letter "R," indicating reverse speed gear, is at the left end of the narrow slot. The right-hand portion of the slot is approximately twice the width of the left-hand portion, thus providing a shoulder 110 therebetween. When the shaft 92 is in its lower (supplemental) position, the pointer will lie in the wide portion (forward speed drives) of the slot. In order to manipulate the pointer 108 into the narrow portion "R" or into the upper side of the wide portion of the slot "L," it is necessary to move the shaft 92 by means of the lever 107 upwardly against the compression of the spring 106.

To inaugurate and effect [an] operative power-upshifting of either two or three forward speeds, the manual shift lever 107 must be moved to its "Drive" (range) position in order that the selector valve 101 *may be conditioned to enable energization of the* [and] associated servomechanism *to effect* [can be energized for] such power shifting. This lever movement effectively utilizes the inhibiting function of the limiting mechanism 50—54 and 86—89, inclusive, to prevent power neutralization of low speed prior to establishment of a vehicular drive therethrough. Thus, it is seen that the setting of the shift lever 107 from "N" to drive-range position presents the shift lever 107 to a position wherein axial displacement of the lever 107 may occur for opening the selector valve element 102 to render the shifting fork arm 26 selectively effective to control, by rotational movement thereof, other higher speed drives. This novel pattern of shift lever movements for control of the aforesaid power shifting operations is clearly and specifically depicted in Figures 1, 10 and 15.

In addition to the structure already described, there is provided an interlocking means for preventing either of the shifting forks 19, 20 from being shifted to a speed drive operative position when the other shifting fork is in an operative position. This interlocking means is best shown in Figure 3 and, briefly described, comprises an arm 111 pivoted on the inside of the cover plate on a shouldered pin 111' and provided at its free end with a bore 112. In the ends of the bore 112 are balls 113 and 114 having interposed therebetween a spring 115 and a short guide rod 116. On the arm 23 carrying the shifting fork 20 is a flange 117 provided with recesses 118, 119 and 120 in its free contoured edge. On arm 26 carrying the shifting fork 19 is a flange 121 with recesses 122, 123 and 124 in its free contoured edge. These recesses cooperate with the balls 113 and 114, respectively, to yieldably hold the arms in their different speed drive controlling positions.

On each side of the neutral recesses 119 and 123 are flat surfaces 125 for cooperation with the opposed flat ends of the portion of the pivoted arm 111 carrying the ball detent structure. When the shifting fork carrying arms 23 and 26 are in their neutral positions shown in Figure 3, pivoted arm 111 will have pivotal movement between the confronting flat surfaces 125 equal to the rise of the flange contour edge beyond the flat surface. When either shifting fork carrying arm 23 or 26 is moved to a gear drive position, one of the flat ends of pivoted arm 111 will be urged by the flat surface of the flange against the confronting flat surfaces on the sides of the neutral recess in the flange which is not being moved to thus hold this flange and its associated shifting fork carrying arm from being moved, since the pivotal movement of arm 111 is eliminated when interposed between the flat surface of a neutral shifting fork and the contour of the active shifting fork.

Operation

When the transmission is in its neutral position, the shift lever 107 will be in the position shown in Figure 24 and the pointer 108 will be opposite the letter "N," and in the lower wide portion of the slot 109 adjacent shoulder 110. The other parts of the control mechanism will be as shown in Figures 1, 2, 3, 5 and 10, Figures 2 and 3, however, showing the parts controlled by the clutch pedal 4 in the position corresponding to clutch-disengaged condition. Under these conditions, the selector valve element 102 controlled by the gear-shift control shaft 92 will be in a corresponding closed position as shown in Figure 11. The shift-control valve 59 will be in the open operating position shown in Figure 2, thus causing the piston 40 of the servomotor 37 to assume its reset position at the extreme rear end of the cylinder 38 in readiness to perform a speed-changing operation. Both shifting forks 19, 20 will be in a position wherein the transmission elements 6 and 15 respectively, which they control, are inoperative (neutralized). The two neutralizing levers 45 and 46 will be in their innermost positions wherein they will be held by the action of spring 49. The double-arm lever 27 will be in the position shown in Figure 2 wherein the apex 32 of the selecting means will be so positioned that the pin 35 will ride into the hooked end 28 of the lever 27.

If the clutch pedal 4 is in its clutch-engaged position "A," arm 83 on the clutch shaft will be in the position shown in Figure 1. To disengage the clutch to interrupt transferral of driving torque therefrom, only incremental movement need be imparted to the clutch pedal, such as the movement from the full line position marked "A" in Figure 1 through an operating range to a first dotted line indication marked "B" in Figure 1. This movement of the clutch pedal will not cause any operation of the arm 81 when this arm is positioned as shown in Figures 1, 2 and 3 and so held by bell-crank lever notch 88 being engaged with pin 86. The pin 82 of arm 83, however, will be brought into initial engagement with the arm 81 when the clutch pedal is moved through the range "A"—"B" if valve element 62 is operated by spring 76 to the position shown in Figure 9 wherein the limiting means is ineffective (pin 86 out of notch 88 of bell-crank lever 87). If the arm 83 is engaged by the movement "A"—"B," then by additionally moving the clutch pedal through a second range "B"—"C" the valve element 62 will be moved from the position shown in Figure 9 to the position shown in Figures 2 and 3. When the clutch pedal is moved to its fully depressed extreme position, as indicated by the dotted position "D" in Figure 1, the power-shift control valve 59 will continue to connect the rear end of the servomotor 37 to the engine intake manifold 68, but the valve element 62 thereof will be rotated a slight additional distance from the position shown in Figure 2 which will be sufficient to accommodate disengagement of the bell-crank lever 87 from the pin 86 (if so engaged) carried by the upper end of the lever 74 attached to the valve element 62, and thus render the limiting means, comprising the structure 50—54 and 86—89, inclusive, ineffective to perform its low speed monitoring function.

If it should be desired to obtain low speed, the clutch is disengaged by fully depressing the pedal to its extreme position "D," and then the shift lever 107 is grasped by the operator and pulled upwardly in its neutral position "N" and then rotated in a clockwise direction so that the pointer is opposite "L." This will result in cross-pin 98 on the lower end of the gear shift control shaft 92 engaging in slot 99 of arm 91 and cause rotation of said arm 91 and said lever 24 in unison. Figure 13 shows the pin 98 engaged with slot 99 and arm 91 in rotated position. This results in the shifting fork 20 being manually moved forward and the low speed gear 15 engaged with the countershaft gear 16. After shifting the lever in the manner described to render operative the low speed drive, the engine clutch is then re-engaged and the car moves forwardly in low speed upon acceleration. It will not be necessary to hold lever 107 upwardly after it has been moved to the position wherein pointer 108 indicates "L" and while the clutch is held disengaged unless it is desired to maintain low speed drive effective for vehicular accelerations.

When the shift lever has been moved to the "L" position and released, spring 106 will automatically move the gear shift control shaft 92 and lever 107 downwardly to the position wherein the pointer 108 indicates "Drive," thus causing cross-pin 98 to leave slot 99 and move into slot 100 (Figure 14), since this slot is of sufficient width to receive pin 98 irrespective of whether the shaft 92 is in the position wherein the pointer 108 indicates "N" or "Drive." It is important to note here that this axial cross-over movement of the shaft 92 mechanically disconnects lever 107 from shifting fork 20 of the low speed slidable gear 15 without moving the fork 20 from its rotated drive establishing position so that the power-movement of this gear back to neutral will not cause any movement of the lever 107. The aforesaid axial movement of the shaft 92 also places the cross passage 103 of the selector valve element 102 in a position to open up the conduit 67 and thus condition the servo-mechanism for operation to render low speed ineffective and second (intermediate) and high speed drives alternately operative upon operation of the shift-control valve 59. The position of this valve element is now as shown in Figure 12. The servomotor cannot be operated under the above conditions so long as the shift lever 107 occupies the "L" position notwithstanding the limiting means 50—54 and 86—89 is ineffective and the shift control valve 59 is operative to either of its servomotor controlling positions, due to the closed condition of the selector valve element 102. Thus, the servomotor piston 40 cannot be energized and remains in its re-set position at the rear end of the cylinder.

Figure 16:
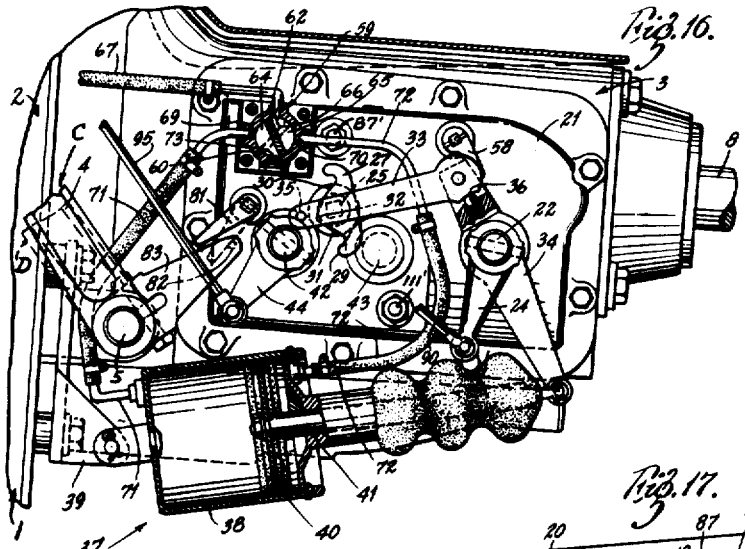
Figure 16 is an exterior view of my control mechanism showing the control parts in low gear position and the control pedal in clutch-disengaged position.
Figure 17:
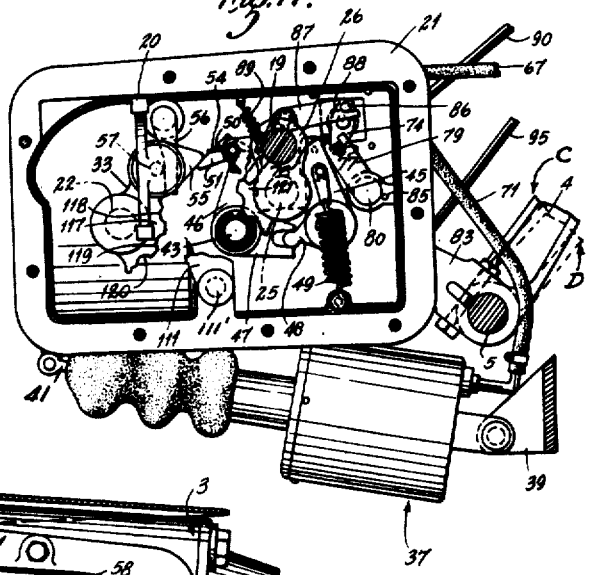
Figure 17 is a view of the control parts on the inside of the closure plate when they are in low gear position.

The position of the parts on the inside of the cover plate 21, when low speed is operative prior to depressing the pedal 4 to its "D" position to render the limiting means 50—54 and 86—89 ineffective as best shown in Figure 9 are shown in Figure 17, and those on the outside of said cover plate are shown in Figure 16. It is to be noted that neutralizing levers 45 and 46 are not spread apart, and pin 57 on fork 20 is adjacent arm 56 and the selector valve element 102 (see Figures 1 and 13) is closed.

If it is now desired to obtain intermediate speed, the clutch pedal 4 need only be incrementally depressed sufficiently to interrupt the drive torque on the gearing, as through the range of movement "A"—"B." This limited actuation of the pedal is ineffective to rotate the shift valve 59 from its speed drive controlling position (see Figure 9) established when the shift lever 107 was set in its "L" position to coordinately render operative low speed drive and render the limiting mechanism 50—54 and 86—89 inoperative to control the shift valve 59. Therefore, upon moving the selector-lever 107 from its "L" position to its drive range position "Drive," which operation opens the selector valve 101, the piston 40 of the servomotor 37 will be energized to effect transition from low speed drive to intermediate speed drive responsive to the single selective operator movement of the selector-lever 107 into "Drive" position *and the selecting means 30, 32 normally controlling intermediate speed drive operation.*

Figure 18:
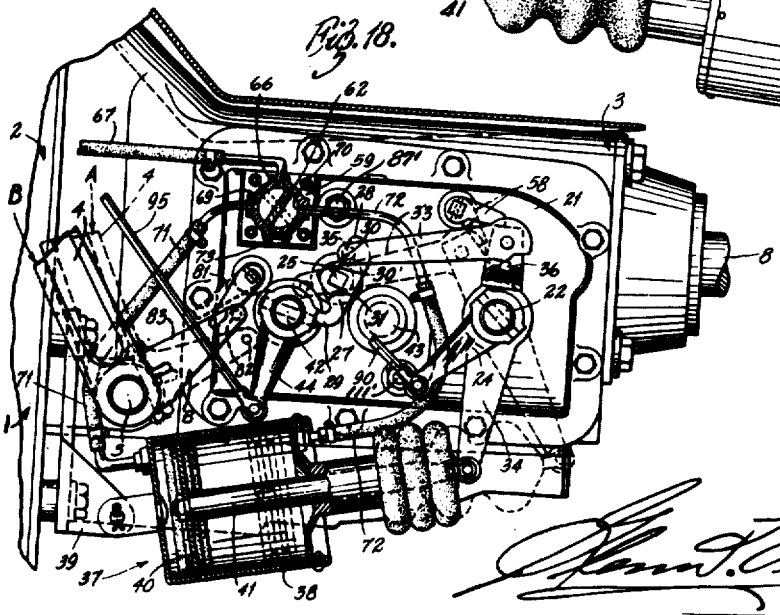
Figure 18 is an exterior view of my transmission control mechanism showing the positions of the control parts when moved to second (intermediate) gear established position with the clutch pedal depressed to its initial clutch-disengaged position of its travel.

Release of the clutch pedal to its extreme position "A" will now establish vehicular drive in intermediate speed. To obtain this highly desirable and advantageous power-transition shift, the various control elements operate in the following manner: When the clutch pedal was depressed to its "D" position while low speed drive was made operative by movement of shift lever 107 from "N" to "L" position, the limiting means 50—54 and 86—89 inclusive was rendered ineffective to hold shift valve 59 in servomotor operating position shown in Figure 2, but the selector valve element 102 remained closed although operated to a different closed position. Thus, when the pedal 4 was released to its "A" position to establish vehicular drive in low speed, the shift valve element 62 assumed its servo speed-changing position as shown in Figure 18, but the pressure fluid is still ineffective to energize the servomotor due to the closed condition of selector valve 102. However, upon merely moving the selector-lever 107 to its "Drive" position, and without shift valve actuation to change the drive condition since it is already so positioned, the opening of the selector valve 102 in the aforesaid setting of the selector-lever will cause power-transition by the servomechanism from low speed drive to intermediate speed drive.

When the lever 34 is being moved to cause low gear to be inoperative, pins 35 of the end of link 33 of the servo-mechanism will ride up the surfaces 30' and 30 of the double-arm lever 27 and engage the hooked portion 28. This hooked portion will be engaged substantially at the point of the low gear disengagement with the piston 40 of the servomotor 37 at substantially halfway travel. Continued movement of lever 34 will no longer cause any movement of the low gear as lever 34 will now move relatively to arm 58, whereby said arm rides to the top of lever 34 as shown in Figure 18.

As the piston moves through substantially the latter half of its full travel from the rear end to the forward end *of cylinder 38*, it will cause link 33 to rotate the double-arm lever 27 in a clockwise direction, as viewed from the exterior of the closure plate, as best seen in Figure 18. Rotation of this lever 27 will cause movement of the shifting fork 19 and clutch element 6 and result in the engagement of teeth 12 and 13, thereby making second (intermediate) speed operative. When the shifting fork 19 moves rearwardly in the transmission to shift the clutch element 6 into mesh with clutch teeth 13 to establish intermediate drive, lever 46 of the two neutralizing levers 45 and 46 will be engaged by the arm 26 and said two levers will be spread apart, such movement being accelerated by the over-center *action of* spring 49 which will hold them spread apart. The spreading apart of levers 45 and 46 causes arm 44 to be rotated which rotates shifter arm 96 to the position shown in Figure 15. Slot 100 accommodates free movement of the arm from the position shown in Figure 14 to that shown in Figure 15 and, therefore, selector lever 107 will not be moved out of its "Drive" position. Movement of lever 46 will also result in the pawl 50 being retracted as a unit from the bell-crank lever 87 which lever is already in its released position wherein it is ineffective to inhibit actuating of the shift valve 59 by pedal 4. It is to be recalled that the movement of the clutch pedal to the position "D" in rendering low speed operative resulted in release of the bell-crank lever 87 by engagement of projection 55 with projection 52, whereby the pawl 50 was rotated relatively to lever 87 to effect the aforesaid releasing operation.

Figure 19:
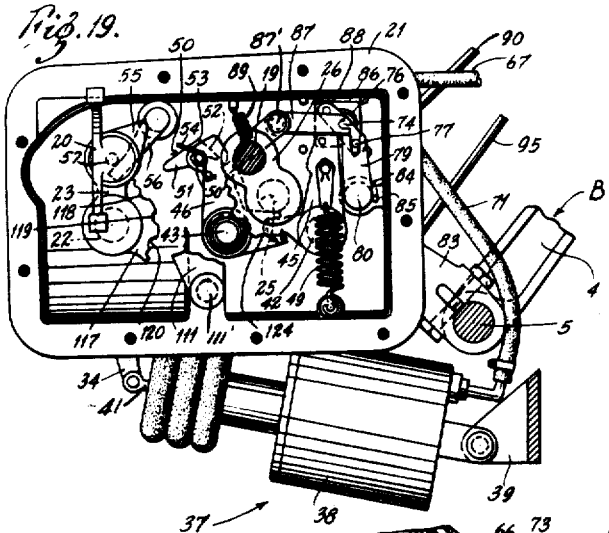
Figure 19 is a view of the control parts on the inside of the closure plate when they are in intermediate gear established position.

When the clutch pedal reaches the clutch-engaged position "A," low speed vehicular drive will be rescinded and intermediate speed drive will be rendered operative to drive the vehicle. The positions of the parts inside the cover plate when intermediate speed is operative are shown in Figure 19. In Figure 18 the intermediate speed operative positions of the double-arm lever 27, link 33 and the piston of the servomotor 37 are shown in full lines. In making the change of gear ratio from low speed to intermediate speed, it is to be particularly noted that the selector lever 107 was moved by the hand from "L" to "Drive" position to cause this power-transition from low to intermediate speed, and no other operation of the control means was required. Thus, power-transition from low speed drive to intermediate speed drive is effected by the single operator act of moving the selector lever 107 from its "L" to its "Drive" position *since the selecting means 30, 32 is normally positioned to control intermediate speed drive operation.*

If it is desired to obtain high speed drive, the control pedal 4 need only be again depressed and then released to actuate the shifter valve 59, the extent of depression necessary only being through the range "A" to "C" of Figure 1, although further depression even to the 'D" extreme position will in no way affect the proper servo-transition from intermediate to high speed drive, nor damage the control valve mechanism, since this excessive depression of the clutch pedal merely results in idle over-run movement of the valve element 62 in its servo-reset position, and is done solely for the purpose of releasing the bell-crank lever 87 from pin 86 of the valve lever 74 to render the power-shift inhibiting function thereof ineffective, which operation has already been completed with the setting of the shift lever 107 in its "L" position. When the clutch pedal is depressed, the clutch will be disengaged when the clutch pedal passes through a sufficient range of movement as from "A" to "B." When the pedal is depressed through the ranges "A"—"C" or "A"—"D," the valve element 62 of the shift-control valve 59 will be again rotated to the position shown in Figures 2 and 3 and the rear end of the servo-motor 37 will be again placed in communication with the intake manifold 68. This will cause the piston 40 of the servomotor 37 to be energized and moved to the rear end of its cylinder and the lever 34 moved in a counterclockwise direction carrying with it the link 33. Link 33, piston 40 and lever 34 assume the positions shown by dotted lines in Figure 18. Since the apex 32 of the double-arm lever 27 is now above pin 35 on the link *due to the selecting means 30, 32 being operated to select high speed drive operation*, the pin will be caused to engage with the hooked arm 29 of said lever when link 33 is again moved rearwardly as a result of the piston of the servomotor moving from the rear end of the cylinder to the forward end. As will be apparent, this operation of the servomotor is solely determined by the pedal when the same is moved to positions "C" or "D" to cause a resetting of the servo-mechanism.

Figure 20:
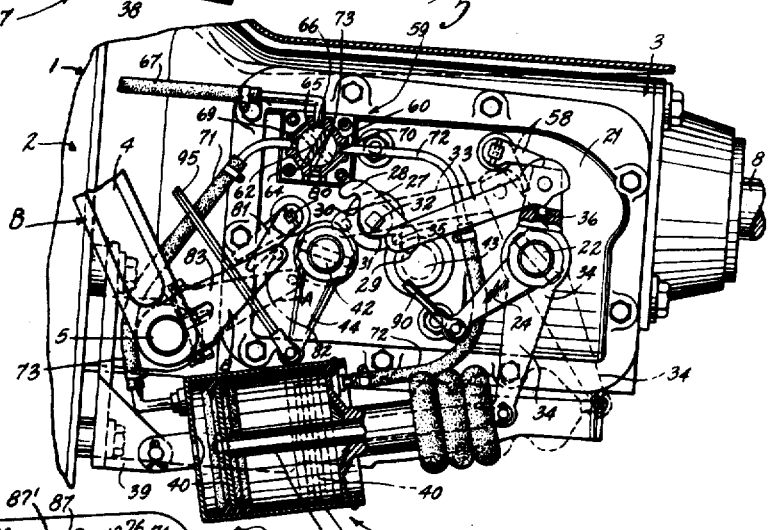
Figure 20 is an exterior view of my transmission control mechanism showing the control parts in high gear established position.
Figure 21:
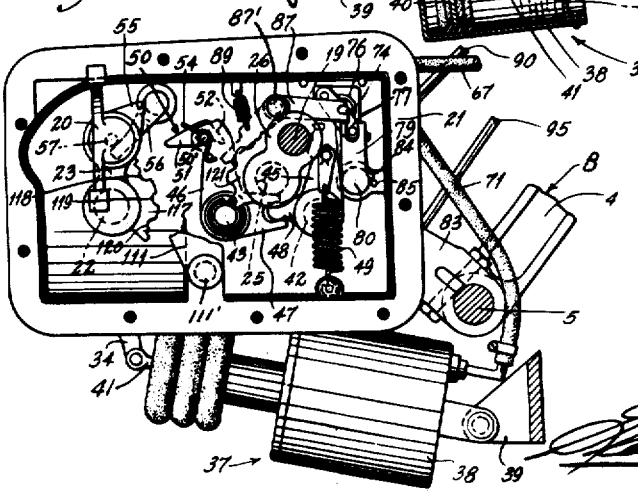
Figure 21 is a view showing the positions of the control parts on the inside of the closure plate when they are in high gear established position.

When the clutch pedal is now released, the valve element 62 of the shift-control valve 59 will again assume the position shown in Figure 9 under the action of the spring 76, this positioning of the valve taking place during the movement of the clutch pedal through the incremental range from "C" to "B." The forward end of the servomotor will now be placed in communication with the source of motive power, i. e., the intake manifold 68, and consequently the piston 40 is moved to the forward end of the cylinder. This will rotate the lever 34 in a clockwise direction, and as link 33 is pulled rearwardly, pin 35 will slide down the inclined surface 31, engage the hooked end 29, and rotate the double-arm lever 27 *counterclockwise*. This will cause intermediate speed to become inoperative and high speed drive to become operative as a result of the shifting fork 19 being moved to cause disengagement of teeth 12 and 13 and the engagement of teeth 9 and 10. There will be no movement of the neutralizing levers 45 and 46 since these levers are already spread apart. Also, there will be no movement of the shifting arms 91 and 96 at the lower end of the shifting shaft 92. Figure 20 shows the position of the servomotor piston 40, arm 34, link 33, and double-arm lever 27 when high speed direct-drive ratio is caused to become operative. Figure 21 shows the positions of the parts on the inside of the closure plate when high speed is operative.

If vehicular conditions are now encountered making it desirable to effect a lower speed, second (intermediate) speed drive may again be re-engaged by merely depressing the clutch pedal through the range from "A" to "C" or "D" and releasing it. This is brought about by the fact that the double-arm lever 27 is in a position *selecting intermediate speed drive operation* so that when the servomotor piston is reciprocated, lever 34, by means of a link 33, will cause rotation of the double-arm lever 27 in a clockwise direction (as viewed from the outside) to cause disengagement of teeth 9 and 10 and engagement of teeth 12 and 13, thereby making the high speed inoperative and the second speed operative. A subsequent depressing and releasing of the clutch pedal through the same range of movement from "A" to "C" or "D" will again place the transmission in high speed drive. Thus, it is seen that after the transmission has been placed in second speed, successive depressing of the clutch pedal and release thereof between a first and second position will result in the high and second speeds being made alternately operative without disturbing the "Drive" position setting of the hand lever 107.

If the transmission is in either second or high speed and if is desired to neutralize the transmission, it is only necessary to depress the clutch pedal to extreme position "D" and then move the hand lever out of "Drive" position to a position adjacent the shoulder 110 opposite the letter "N." This movement of lever 107 will close the selector valve 102 to disable *fluid operation of* the servomotor 37 notwithstanding that the shift-control valve 59 may be in its servo-operating position, as shown in Figure 9, due to failure to depress the clutch pedal to position "D," and cause pin 98 to engage and move arm 96 and link 95 to rotate arm 44 in a clockwise direction whereby the neutralizing levers 45 and 46 will be moved inwardly. As soon as the spring 49 moves over the pivotal center of lever 45, its force will then be added to that of the manual effort to assist in bringing the levers 45 and 46 fully inwardly to accomplish neutralization. If this spring is made strong enough, it can accomplish the neutralizing operation by its force alone as soon as manual effort effects its release by moving it over the pivotal center of the neutralizing lever on which it is anchored. If the gear-shifting fork 19 is in high speed position, lever 45 will engage arm 26 which carries the shifting fork and thereby move it to its neutral position. If the gear-shifting fork is in second speed position, arm 46 will engage arm 26 and move the shifting fork 19 to its neutral position. This again places double-arm lever 27 in the intermediate drive selecting position shown in Figure 2. Thus, by moving hand lever 107 back to its "N" position, the gearing is positively neutralized by manual effort and intermediate drive selected. When the hand lever is in the position marked "N," the driver knows that the gearing is in neutral position. The placing of the hand lever at "N" also cuts off conduit 67 by the selector valve 101 at the lower end of the shift control shaft 92 mounted on the steering column so that the servomotor 37 cannot function to cause any accidental shifting.

It is to be noted that when neutralization is accomplished by the hand lever 107, said lever does not have to move the piston 40 of the suction motor 37. When the clutch pedal is depressed to position "D," the piston of the suction motor assumes a reset position at the rear end of the cylinder and consequently the pin 35 and the link 33 are forward of the apex on double-arm lever 27. Thus, lever 27 is freely movable with the shifting fork 19. When the neutralizing levers are moved toward each other in neutralizing the transmission and selecting intermediate drive, pawl 50 carried by lever 46 will move to a position wherein projection 52 will engage the bell-crank lever 87 and hold it in a registering position wherein pin 86 will engage in notch 88 when the clutch pedal is released from position "D." The valve element 62 is thus again set and held in the position shown in Figure 3. The piston of the suction motor remains reset at the rear end of the cylinder.

If the transmission should be in low speed drive when it is desired to neutralize the transmission, lever 107 need only be returned from the position "L" to the position marked "N." This will positively disengage gear 15 from gear 16 by means of the direct linkage connection to arm 24.

If it should be desired to start the vehicle in intermediate speed drive instead of in low speed drive, this can be accomplished *due to the selecting means 30, 32 normally controlling intermediate speed drive operation when the vehicle is standing with the gearing neutralized*, by initially moving the clutch pedal to the extreme position marked "D," then operating the selector-lever 107 [directly] from "N" position to "Drive" position. With the selector-lever 107 thus positioned in "Drive" setting, actuation of the clutch pedal to the position "D" will release the pin 86 from the notch 88 of the bell-crank lever 87, thus releasing the lever 87, so that spring 89 can move the lever 87 out of registry with the pin 86 and the valve element is rotated by the spring 76 to its shift controlling position shown in Figure 9 upon release of the clutch pedal to its "A" or "B" position depending upon whether the clutch is desired engaged. This releasing of the clutch pedal will thus energize the shifting-motor 37 and cause the low speed drive to be rendered inoperative and the intermediate speed drive to be rendered operative before vehicular drive through the clutch is effective. By this procedure, although low speed drive was made operative, it was again made inoperative and intermediate speed drive made operative before the clutch was re-engaged to transmit drive torque. Thus it is seen that the automobile will start in intermediate speed drive rather than in low speed drive. All that was necessary to obtain this condition was the initial depressing of the clutch pedal to the extreme positioned marked "D," instead of through the range "A" to "C," as is necessary when low speed is maintained effective by the limiting mechanism 50—54 and 86—89 inclusive for use in starting the vehicle *with the manual selector 107 in "Drive" position.*

When the transmission is in either intermediate or high speed, and it is desired to obtain low speed, this is accomplished by neutralizing the effective drive of the transmission by moving the shift-selector lever 107 to its "N" position and then obtaining low speed in the same manner as already described in starting the vehicle. Thus, in order to reinstate low speed after servo-mechanism inactivation thereof, it is necessary to move the selector lever 107 through a complete cyclic movement including its "N" position and subsequent re-positioning of the lever in its "L" position *in which low speed is utilizable as a drive* to obtain low speed only, or to its "Drive" position to inaugurate power upshifting from low to intermediate and high speed drive, or alternately between intermediate and high speed drives.

If it is desired to obtain reverse speed, this is readily accomplished by first disengaging the engine clutch by moving the pedal 4 through any of its incremental ranges of movement from "A" to "B," "C" or "D" and then raising up lever 107 in its "N" position and rotating it in a counterclockwise direction so that the pointer 108 is at the portion of the slot marked "R." Such movements of lever 107 will swing the arm 24 in a clockwise direction from the position viewed in Figure 1 and will result in the shifting fork 20 moving gear 15 into engagement with the reverse idler gear 17.

Operational summary

In connection with the operation of the control mechanism described, by way of example, as embodying the invention, it is to be particularly noted that, if the operator should desire to remain in low speed, regardless of the disengaging of the clutch and the movement of the pedal to the position "D," he may do so merely by holding the gear shifting lever 107 upwardly in the position marked "L" following movement thereof from "N" or "R" position, so that the selector valve element 102 cannot assume its open position as shown in Figure 12. Under such conditions, the shift-control valve 59 and the suction motor 37 cannot be connected to the intake manifold 68, and thus the movement of the control pedal 4 will not cause the motor power means to function to neutralize low gear. The operator, therefore, has full control over low speed at all times, if he so desires, in the manner above stated.

The functioning of the servomotor and the establishment of either second or high speed cannot be obtained unless the selector-lever 107 is moved to assume the "Drive" position (referred to in some of the claims as the high range position) wherein the selector valve element 102 provides for connection of the intake manifold 68 with the control valve 59, said shift lever in "Drive" position also mechanically disengaging said lever from said low speed shifting fork 20. If desired, the spring 106 can be eliminated, so that the gear shifting lever 107 must be manually operated downwardly to open the valve element 102 and to mechanically disconnect the lever 107 from the shifting fork 20. With such an arrangement, the operator can maintain low speed indefinitely *as a drive* without holding upwardly on the lever 107 against the bias of the spring 106.

It is also to be recognized that, in the particular embodiment of the invention shown by way of example, the control pedal 4 is employed as a pedally operable member for both disengaging the clutch to interrupt the engine torque through the transmission gearing and actuating the power-shifting control valve 59. It is not intended, however, in the broad aspects of the invention to limit the actuation of the control valve 59 by the clutch pedal, as this may be accomplished by some other pedally-controlled member of a motor vehicle, recognized in the art as constituting an equivalent in the patent sense. It will be noted that the control pedal 4 has two ranges of movement with respect to the control of the transmission control means, these being a first range "A" to "B" wherein the clutch is disengaged and the control valve 59 is in one of its motor operative conditions to accommodate control of certain transmission shifting operations, and the other or second range "B" to "C," which is beyond the range "A" to "B." To perform a speed-changing operation, the pedal is moved through its first and second ranges of movement and returned. There is also an extreme position of the pedal which is important in the operation of the motor power shifting mechanism; i. e., the position indicated at "D," normally effective when low speed drive is rendered operative to drive the vehicle at the "L" position of lever 107. This position, which is predetermined, causes a release of the pin 86 from the notch 88 of the bell-crank lever 87, so that the valve element 62 of the control valve 59 can be operated for control of the power-operated mechanism. Return movement of the pedal through the range "D" to "B" releases spring 76 to function for placing the valve element *62* in its other motor operating position shown in Figure 9 wherein a shift to second speed is effected. After the control valve 59 has been released for operation and placed under control of the movements of the control pedal 4 and second speed is obtained, subsequent depression of the pedal 4 through its movement "A"—"C" (or beyond) will [effect] *cause* resetting of the motor-power shifting mechanism, and upon return of the pedal 4 through the range "C"—"B," a power-transition to a selected speed will ensue.

The clutch pedal 4 is illustrated for the purpose of embracing all such operator-controlled members recognized in the art as coming within the range of equivalents in the patent sense, but not limiting the control of the clutch-coupling 2 to direct operator effort transmitted through such members since conventional operations of such members are utilized to either directly actuate the aforesaid clutch-coupling or accommodate power-control thereof by any well known power-operated means whenever such a member is operated into an extreme operating position. This extreme position of such an equivalent control member would accommodate the same position of the shift-control valve 59 (see Figure 2) as [it has] *depicted* in the specific control mechanism shown in the present embodiment wherein the clutch pedal 4 is moved through range "A"—"B" with the power-mechanism reset. When such control member is predeterminately depressed from its extreme position, then the control valve 59 would be caused to have the same operating conditions [that it has] *depicted* in the disclosed control mechanism when the clutch pedal 4 is initially moved through ranges "A," "B" to "D" to place the valve 59 under control of said pedal, and then returned to position "B" to operate the control valve 59 into position of Figure 9 wherein the motor-power shifting mechanism is energized to effect the selected shift. Thereafter, successive cyclic movements of the pedal from "A" or "B" to position "C" or beyond and return causing the power-shifting mechanism to reset, and effect the selected speed changes.

It will be apparent that with the control mechanism embodying the present invention an operator can obtain, with the pedal control feature, a low speed drive when the pedal undergoes movement "A"—"B," but when said pedal is moved to its predetermined extreme position "D," while the low speed drive is in its established condition, mechanism is caused to function automatically whereby it will no longer be possible to maintain low speed established, and thereafter the power-operated mechanism will be effective to establish a higher speed by release of the pedal. Subsequent depressing of the pedal through the range "B"—"C" will then accomplish desired motor power-shifting between intermediate and high speed drives.

One of the salient features in the improved control means resides in the manner of functioning of the servomotor 37. It is to be particularly noted that the movable *power* element 40 of the motor performs its speed-changing operations by movement in one direction only. Its resetting movement in the opposite direction is idle travel and no shifting operations are performed thereby. This idle travel, however, is utilized to reset the control mechanism to its next shifting position so that it will be in condition to establish a selected speed when the movable element of the motor is energized to make its shifting movement. The resetting occurs during the movement of the pedal 4 through the range "B"—"C" or "D" after clutch disengagement, and thus the mechanism is conditioned to make the selected shift when the pedal is returned through "C" or "D"—"B" movement, said return movement causing the control valve element 62 to produce proper fluid pressure connection between the fluid-pressure motor 37 and the intake manifolds 68 of the engine *via open selector valve 101* to energize the movable *power* element of the motor to perform its shifting function.

Another important feature of the present invention is the utilization of a governing or limiting mechanism for inhibiting the operation of the power means or servomotor 37 to render inoperative the successively higher speed drives until low speed drive has been first utilized for vehicular acceleration *when the manual selector 107 is in "Drive" position*. This limiting governing mechanism structurally comprises the mechanism indicated on the drawings by the reference numerals 50–54 and 86–89, inclusive. The term "limiting governing mechanism" as applied to this sub-assembly is proper since the function served is equivalent to a governor which may be used as a functional equivalent in the patent sense.

A second and related controlling function is performed by the selector valve 101, which selects inoperative and operative change-speed drive conditions in accordance with the indicated shifting movements of the shift-lever 107. The selector valve 101 is actually a manual valve and nothing more, the valve element 102 of valve 101 being movable in unison with the shift-lever 107 to its selecting positions, and no conditioning function is served thereby *except to control the supply of pressure-fluid to the aforementioned shift-control valve 59*.

Thus, premature functioning of the servomotor 37 is prevented by two separate but correlated drive control means; namely, the limiting mechanism 50–54 and 86–89, inclusive, and the selector means *101–107* [30–32], inclusive. The conditioning operation necessary to actuation of the servomotor 37 is the act of rendering low speed operative or, more precisely, the single act of establishing low speed drive *in response to the "L" position setting of the selector-lever 107*. In turn, the rendering operative of low speed drive also accommodates a subsequent automatic disabling of the limiting mechanism to place the shift-control valve 59 under control of the control pedal 4 for causing the servo-mechanism to vary the effective drive of the transmission.

It is thus seen that the drive governing control means include the limiting and selecting mechanisms; i. e., the structures 50–54, 86–89, and 30–32 inclusively, which are operable to predetermine the activation of low, intermediate and high forward speeds, or for vehicular drive limited to intermediate and high speeds upon the rendering of low speed operative by a single "drive range" setting of the shift lever 107 from its neutral "N" position. These two mechanisms provide an effective speed drive governing means, inasmuch as the aforesaid limiting mechanism 50–54 and 86–89 controls the upshift from low to intermediate drive, and the selecting means 30–32 controls the upshift from intermediate to high speed drive and alternately therebetween. The inhibiting and selecting functions of the drive governing means are correlated with the control of the valve 59, each being dependent upon the other to cause a change in the effective drive of the change-speed mechanism. The governing means must operate to predetermine a new drive condition, and the valve 59 controlled by the pedal 4 to cause the servo-mechanism to render such new drives effective *with the selector valve 101 in open position*. Therefore, it is seen that a speed-changing cycle is caused by correlated functions of the drive governing means and the pedally-controlled valve 59 upon rendering low speed drive operative to transmit drive torque. Further, the entire upshift operational sequence may, if desired, be effective through the sole medium of a control pedal with the shift lever remaining in "Drive" position throughout.

To more briefly summarize the operation and control of the disclosed structure:

The manual operation of causing low speed drive to be activated by setting the shift-selector lever 107 directly from its "N" to "Drive" range position constitutes a novel conditioning function whereby the drive governing means comprising structure 50–54, 86–89 and 30–32, inclusive, [is] *are* rendered operative correlatively with the pedally-controlled valve 59 to either cause servo-transition from low speed to intermediate and high speed drives, and thereafter, alternately between intermediate and high speed drives, or servo-activation of intermediate and high speed drives only. If low speed drive is desired effective for vehicular acceleration, as in starting the vehicle, the pedal 4 would under such conditions be operated through a range of movement, for example, as defined by the range "B"—"C," *or the shift-lever* 107 *would be set in its "L" position and the pedal 4 operated to its "D" position*. If intermediate drive is desired in starting the vehicle, low speed drive may be servo-inactivated prior to establishment of vehicular drive therethrough, notwithstanding it was activated in the aforementioned setting of the lever 107 into its "Drive" position, by merely operating the pedal 4 initially to one of its extreme positions, as indicated at "D"; whereupon, drive-torque would be transmitted through intermediate drive instead of low speed drive for starting the vehicle. It is thus seen that the operator has a choice of starting the vehicle either in low speed or intermediate speed drive upon setting the selector 107 in "Drive" range position from "N" position and operating the pedal 4 through a range of movement between its extreme positions to utilize low speed initially, or by including an extreme position in the initial operating movement thereof to thus utilize intermediate speed to start the vehicle.

The manual operation of causing low and reverse speed drives to be selectively activated is conventional in all respects in setting the shift-lever 107 from "N" to "L" and "R" positions, respectively; however, setting of the lever from "L" to "Drive" range position constitutes an important inventive step in the transmission art whereby servo-transition from low speed to intermediate speed drive is effected independently of any pedal movement, *and a further novel concept is provided in setting the selector 107 from "N" to "L" position whereby the three forward speed drives are power-operatable in accordance with subsequent operations of the control mechanism including the selector-lever 107 moved to "Drive" range setting.* Upon activation of the intermediate speed drive in the manner just stated, an upshift into high speed drive and alternate servo-activation of intermediate and high speed drives will ensue, if desired, in response to operating the pedally-controlled valve 59 without affecting the "Drive" range setting of the operator lever 107.

Therefore, the following operator drive control conditions are selectively available in the present invention:

(a) Operating the pedal 4 to its "D" position and the shift-lever 107 from "N" to "L" position activates low speed drive only. Subsequent movement of said lever from "L" to "Drive" range position causes power-transition to intermediate drive without the necessity of operating the pedal as an incidence to such transition;

(b) Operating the pedal 4 through a range of movements as, for example, "A"—"C" or "B"—"C," and the shift-selector lever 107 from "N" to "Drive" range position, causes low speed drive to be activated and effectual in vehicular acceleration;

(c) Operating the pedal 4 from "D" extreme position and the selector-lever 107 from "N" to "Drive" range position causes power-activation of intermediate drive;

(d) Establishment of either low or intermediate speed drive in the manner set forth under operations (b) and (c) provides for ensuing power-transition from low to intermediate and high speed drives, or only high and intermediate speeds upon successively operating the pedal 4 through a range of movement such as, for example, defined by positions "B" and "C";

(e) Upon activating high speed drive in the manner set forth under operation (d), alternate power-change of drive between intermediate and high may be effected solely by successive operation of the pedal 4 through its aforesaid range of movement.

*(f) Setting of the selector means 101—107 from "N" to "L" position conditions for power-operation all three forward speed drives in accordance with subsequent operations of the control mechanism including the selector means moved to "Drive" range position.*

It will be understood that modifications and variations will be readily apparent to those skilled in the art from the preceding description of a presently preferred embodiment of the invention which is for illustrative purposes only, and it is not intended to limit the invention in its broader aspects except as set forth in one or more of the claims appended hereto.

I claim:

1. In an automotive power-transmitting system comprising an engine, a friction clutch, and a change-speed device having enmeshable drive-connections for establishing three different forward speed drives and a reverse speed drive, and actuatable shifting means therefor: means including a manually-controlled member movable from a normally inoperative position for causing said shifting means to establish one of said speed drives by the manual movement only of said member, and other means comprising a pedally-controlled member and a fluid power operated means for causing said one speed drive to be rendered inoperative and the shifting means actuated so that one of the two remaining speed drives is rendered operative without return movement of said manually-controlled member to any position occupied prior to causing said one speed to be inoperative, said other means also embodying means for alternately causing the fluid power means to establish said two remaining speed drives by successive movements of said pedally-controlled member only after the said shifting means has been actuated to cause one of the two remaining speed drives to be operative.

2. In an automotive power-transmitting system comprising an engine, a friction clutch, and a change-speed device having enmeshable drive-connections for establishing three different forward speed drives and a reverse speed drive, and actuatable shifting means therefor: means comprising a manually-controlled member movable from a normally inoperative position for actuating said shifting means to establish a first of said speed drives by the manual movement only of said member, and other means comprising a pedally-controlled member for causing said first speed drive to be inoperative and a second of said speed drives to be rendered operative by actuation of said shifting means without return movement of said manually-controlled member to any position occupied prior to [cause] *causing* said first speed to be operative, said other means also embodying means acting on the shifting means for alternately causing said second and a third of said speed drives to be rendered operative by successive movements of the pedally-controlled member to its normally inoperative position.

3. In an automotive power-transmission system comprising an engine, a friction clutch, and a change-speed device having enmeshable drive-connections for establishing three different forward speed drives and a reverse speed drive, and actuatable shifting means therefor: means comprising a manually-controlled member movable from a normally inoperative position for actuating said shifting means to establish a first speed drive by the manual movement only of said member, other means comprising a pedally-controlled member for actuating said shifting means to render said first speed drive inoperative and a second speed drive operative without additional manual movement of the manually-controlled member, said other means also embodying means acting on the shifting means for alternately causing the second and a third speed drive to be rendered operative by successive movements of the pedally-controlled member after said second speed drive is caused to become operative without returning said manually-controlled member to its normally inoperative position, and means effective for causing, solely by manual effort, the rendering inoperative of any established speed drive at any time by return movement of said manually controlled member to its normally inoperative position.

4. In an automotive power-transmitting system comprising an engine, a friction clutch, and a change-speed device having enmeshable drive-connections for establishing three different forward speed drives and a reverse speed drive, and actuatable shifting means therefor: means comprising a manually-controlled member movable from a normally inoperative position for manually actuating said shifting means and causing one of said forward speed drives to be rendered operative by manual effort applied to said member, other means comprising power means and a movable control member therefor for controlling the shifting means to cause said one speed drive to be rendered inoperative and one of the two remaining forward speed drives to be rendered operative without causing movement of said manually-controlled member, said other means also embodying means for alternately selecting and causing said two remaining speed drives to be operative by successive movements of the said movable control member after said one of the two remaining speed drives is caused to become operative and without movement of said manually-controlled member back to its normally inoperative position, and means independent of the movable control member for the power means for preventing said power means from functioning notwithstanding its movable control means is moved when said manually-controlled member is in its normally inoperative position.

5. In an automotive power-transmitting system comprising an engine, a friction clutch, and a change-speed device having enmeshable drive-connections for establishing three different forward speed drives and a reverse speed drive, and actuatable shifting means therefor: a suction servo-motor, a source of less-than-atmospheric pressure connected to said motor having a movable element, connecting means between the movable element of the suction motor and said shifting means for causing said drive-connections of a second and third speed drive to be alternately made operative by successive reciprocatory movement of the said movable member, means comprising valve means for controlling the reciprocation of the movable element, manual means movable from a normally inoperative position for shifting the shifting means to cause a first of said speed drives to be rendered operative, means for neutralizing the last-named speed drive, if operative, when the suction motor is operated, and means for causing by manual effort either the second or third speed drive to be inoperative, if operative, solely by moving said manual means to its normally inoperative position.

6. In an automotive power-transmitting system comprising an engine, a friction clutch, and a change-speed device having three different forward speed drives establishable by gear sets controlled by two shiftable members having neutral positions, one of which controls a low speed gear set and the other a second and a third speed gear set, a suction motor, selective connecting means between the movable element of the suction motor and the second and third shiftable member for causing the gear sets of the second and third speed drives to be alternately made operative by successive reciprocations of the said movable element, a source of suction, means comprising valve means for controlling the reciprocation of the movable element, manual means movable from a normally inoperative position for shifting the shiftable member of the low speed drive gear set to cause said drive to be operative, means for moving the last-named shiftable member, if operative, to inoperative position by said suction motor when operated, and other valve means for cutting off the source of suction from the suction motor and preventing any operation thereof notwithstanding operation of the first-named valve means when the manual means is in its normally inoperative position.

7. In an automotive power-transmitting system comprising an engine, a friction clutch, and a change-speed device having three different forward speed drives establishable by gear sets controlled by two shiftable members having neutral positions, one of which controls a low speed gear set and the other a second and a third speed gear set, manually-controlled means movable from a normally inoperative position for moving one of said shiftable members to a position to cause the one speed drive gear set to be operative, a pedally-controlled means for moving the second shiftable member to alternately cause the gear sets of the other two speed drives to be operative by like successive movements of the pedal elements thereof, means for causing the one speed drive gear set to be inoperative in the event it is operative when the pedally-controlled means is operated to cause one of the gear sets of the other two speed drives to be operative, said last-named function being accomplished without manual movement of said manually-controlled means, and means for manually moving the shiftable member for the gear sets of said other two speed drives to its neutral position solely by said manually-controlled means when said means is returned by manual effort to its normally inoperative position.

8. In an automotive power-transmitting system comprising an engine, a friction clutch, and a change-speed device having three different forward speed drives establishable by gear sets controlled by two shiftable members having neutral positions, one of which controls a low speed gear set and the other a second and a third speed gear set, manually-controlled means movable from a normally inoperative position for moving one of said shiftable members to a postion to cause the one speed drive gear set to be operative, a pedally-controlled means for moving the second shiftable member to alternately cause the gear sets of the other two speed drives to be operative by like successive movements of the pedal element therefor, means for causing the one speed drive gear set to be inoperative in the event it is operative when the pedally-controlled means is operated to cause one of the gear sets of the other two speed drives to be operative, said last-named function being accomplished without manual movement of said manually-controlled means, and means for manually moving the shiftable member for the gear sets of said other two speed drives to its neutral position solely by said manually-controlled means when said means is returned by manual effort to its normally inoperative position.

9. In an automotive power-transmitting system comprising an engine, a friction clutch, and a change-speed device having different forward speed drives establishable by gear sets controlled by two shiftable members having neutral positions, one of which controls a low speed gear set and the other a second and a third speed gear set manually-controlled means for manually moving one of said shiftable members from a normal neutral (inoperative) position to another position to cause said low speed drive gear set to be operative, a suction motor, selective connecting means between the motor and the other shiftable member to cause the second speed drive gear set to be operative by one cycle of reciprocation of the movable element of the motor and the third speed drive gear set to be operative by a repeated cycle of reciprocation of the movable element, valve means for controlling the reciprocation of the movable element of the motor, a pedally-operated member for controlling said valve means, and means for causing said low speed drive gear set, if operative, to be rendered inoperative by operation of the suction motor and without movement of said manually-controlled means to any position occupied prior to causing said low speed drive gear set to be operative.

10. In an automotive power-transmitting system comprising an engine, a friction clutch, and a change-speed device having three different forward speed drives establishable by gear sets controlled by two shiftable members having neutral positions, one of which controls a low speed gear set and the other a second and a third speed gear set, manually-controlled means for moving one of said shiftable members from a normal neutral position to another position to cause the low speed drive gear set to be operative, means including power-operated means for shifting the other shiftable member to cause the gear sets of the second and third speed drives to be alternately operative, pedally-actuated control means for causing the power-operated means to be operated at will, means for causing the power-operated means to move the first-named shiftable member to a position to cause the low speed drive gear set, if operative, to be inoperative prior to causing one of the gear sets of the other speed drives to be operative, means for manually causing either the second or third speed drive gear sets, if operative, to be inoperative at will by a movement of said manually-controlled means to said neutral position, and means controlled by the said manually-controlled means for preventing the power means to function notwithstanding operation of the control means therefor when said manually-controlled means is in neutral position.

11. In an automotive power-transmitting system comprising an engine, a friction clutch, and a change-speed device having three different forward speed drives establishable by gear sets controlled by two shiftable members having neutral positions, one of which controls a low speed gear set and the other a second and a third speed gear set, a shift-lever movable from a normally inoperative position for moving one shiftable member to cause the gear set of the lowest of the speed dirves to be operative, power means for shifting the shiftable member for the gear sets of the second and high speed drives, a control pedal for causing the power means to be operated at will, selective connecting means between the power means and said other shiftable member for second and high speed drives to cause shifting of said last-named shiftable member in opposite directions, said control pedal and the power means being so associated as to cause said power means and connecting means to be operated in such a manner that initially the second speed drive gear set will be operative, then the high speed drive gear set will be operative, and thereafter the gear sets of said last-named speed drives will be alternately made operative by successive operations of the control pedal, means for causing the low speed drive gear set, if operative, to be made inoperative by the power means when said power means is operated to cause the second speed drive gear to be operative and without additional movement of said shift-lever, and means for neutralizing either second or high speed drive gear sets at will, if active, solely by manual movement of said shift-lever to its normally inoperative position.

12. In an automotive power-transmitting system comprising an engine, a friction clutch, and a change-speed device having different forward speed drives establishable by gear sets controlled by two shiftable members having neutral positions, one of which controls a low speed gear set and the other a second and a third speed gear set, a shift-lever for manually moving the first-named shiftable member from a normal neutral position to another position to cause the low speed drive gear set to be rendered operative, a suction motor, a source of suction, selective connecting means between the motor and the other shiftable member to cause the second speed drive gear set to be operative by one cycle of reciprocation of the movable element of the motor and the high speed drive gear set to be operative by a repeated cycle of reciprocation of the movable element, valve means for controlling the reciprocation of the movable element of the motor, a control pedal for controlling said valve means, means for causing the low speed drive gear set, if operative, to be inoperative by operation of the suction motor and without additional movement of the shift-lever, and means for positively moving by manual effort only either of the shiftable members to their neutral positions by a manual movement of the shift-lever to its neutral position.

13. In an automotive power-transmitting control mechanism for a change-speed transmission system including an engine, a friction clutch actuatable by a clutch pedal, and provided with at least three different forward speed gear ratios establishable by gear sets controlled by two shiftable members having neutral positions, one of which is shiftable from its neutral position in one direction to obtain low speed drive by the gear set thereof and the other of which is shiftable from its neutral position in opposite directions to obtain second and high speed drives by the gear sets thereof, a hand-lever, means operable by movement of the hand-lever from neutral position for causing the first-named shiftable member to be manually moved to place the low speed drive gear set in operative condition while said clutch is disengaged, a suction motor, a source of suction, a valve operable for connecting opposite ends of the suction motor to the source, means for selectively connecting the movable elements of the suction motor to the shiftable member of the gear sets of the second and high speed drives to cause alternate operativeness of the gear sets of the second and high speed drives by each cycle of reciprocation of the movable element of the suction motor, releasable limiting control means for holding said valve in one of its operative positions wherein one end of the suction motor is connected to the source, a spring for moving the valve to its other operative position wherein the other end of the suction motor is connected with the source, means effective to release said limiting means when said clutch pedal is moved to an extreme position beyond clutch-disengaged position to accommodate control of said valve by successive movements of said clutch pedal, and means for neutralizing said low speed drive gear set by the suction motor when said motor is initially operated and without additional movement of said hand-lever, said selective connecting means being so arranged that when the suction motor is initially operated as a result of said valve means being controlled by the movement of said clutch pedal that said second speed drive gear set of the two higher speed drives will be made operative first.

14. In an automotive power-transmitting system comprising a friction clutch, and a change-speed device having at least three different forward speed drives establishable by gear sets controlled by two shiftable members having neutral positions, one of which controls a low speed gear set and the other a second and a third speed gear set, a double-arm lever operably connected to said shiftable member for the second and third speed drives, a suction motor, means for alternately connecting the movable element of the suction motor to the arms of the lever upon successive cycles of reciprocations thereof to thereby cause alternate operativeness of the gear sets of said second and third speed drives, a source of suction, a valve for connecting opposite ends of the suction-motor to said source of suction, a pedally-operable member for controlling said valve, a hand-operated member for moving said shiftable member of the low speed drive gear set to cause said drive to be operative, means for neutralizing said low speed drive gear set by said suction motor without movement of the hand-operated member, means for manually moving either of the shiftable members to its neutral position by the hand-operated member, and selector valve means controlled by the hand-operated member for cutting off communication between said motor and source of suction when said member is moved to a position to place a shiftable member in neutral position.

15. In an automotive power-transmitting system including an engine, a friction clutch actuable by a clutch pedal, and a change-speed transmission provided with at least three different forward speed drives controlled by two shiftable members having neutral positions, one of which is shiftable from its neutral position in one direction to establish low speed drive and the other of which is shiftable from its neutral position in opposite directions to establish second and high speed drives, a hand-lever, means operable by a movement of the said hand-lever from a neutral position for causing said first-named shiftable member to be manually moved by operator effort applied to said lever to place the low speed drive gear set in operative established condition while said clutch is disengaged, means controlled by a movement of said clutch pedal within extreme position thereof beyond clutch-disengaged position for causing said low speed drive gear set to be neutralized and said other shiftable member to be moved to cause the second speed drive gear set to be operative and without additional movement of said hand-lever, means controlled by a successive movement of said clutch pedal for so moving the said last-named shiftable member as to cause said second speed drive gear set to be inoperative and said high speed drive gear set to be operative also without any movement of said hand-lever, and means for moving at will said last-named shiftable member to neutral position by manual effort only when said hand-lever is returned to neutral position.

16. In an automotive power-transmitting system comprising an engine, a friction clutch, and a change-speed device having at least three different forward speed drives establishable by gear sets controlled by two shiftable members having neutral positions, one of which controls a low speed gear set and the other a second and a third speed gear set, a control mechanism for said change-speed device comprising a hand-operated lever operably connected to the shiftable member of said low speed drive gear set to cause said drive to be operative when said lever is moved from neutral position to an operative drive range position, a suction motor having a movable element, a source of suction, means for selectively connecting said movable element of said motor with the shiftable member for the gear sets of said second and high speed drives so that successive reciprocations of said movable element will cause the gear sets of said second and high speed drives to be alternately operative, a valve for alternately connecting opposite ends of said suction motor to said source, means effective for controlling said valve by said clutch pedal when said pedal is moved to an extreme position beyond clutch disengaged position, said valve means being so associated with said pedal and so controllable thereby that successive movements of said pedal to said extreme position beyond disengaged position will cause the gear sets of said second and high speed drives to be alternately operative, means controlled by the operation of said suction motor when said clutch pedal is operated in the manner aforestated and after the gear set of said low speed drive has been made manually operative, for causing neutralization of said low speed drive gear set prior to operation of said second speed drive gear set, and means operable at will by movement of said hand-lever to its neutral position for positively neutralizing by manual effort only either second or high speed drive gear set if established.

17. In a control mechanism for a change-speed transmission having a power train for providing at least three different forward speed drives and manually-controlled means whereby one speed drive of the said power train is rendered operative by moving a shift-lever from one position to another position, means comprising control means for causing the two other speed drives to be alternately activated, shift-limiting control means rendered ineffective upon the said one speed drive being rendered operative for releasing the means comprising said control means for operation to establish the two other speed drives, means for inactivating the one speed drive and activating one of the other two speed drives upon operation of the means comprising said control means and without imparting power-movement to said shift-lever, and means for inactivating any active speed drive by manual effort when the shift-lever is manually returned to its said one position.

18. In a control mechanism for a change-speed transmission having a power train for providing at least three different forward speed drives and manually-controlled *including a shift-lever movable to two positions*, means whereby one speed drive of said power train is rendered operative by moving [a] *said* shift-lever from one *of said* positions to [another] *the other* position, power operated means comprising a control means for causing the two other speed drives to be alternately rendered operative, and means effective upon rendering said one speed drive operative for conditioning said control means to control operation of said power-operated means, when operated by said control means said power-operated means rendering inoperative said one speed drive and rendering operative the two remaining speed drives without causing movement to said shift-lever by said power means *from its other position setting.*

19. In a control mechanism for a change-speed transmission having a power train for providing at least three different actuatable forward drives and manually - control means whereby one speed drive of said power train is rendered operative by moving a shift-lever from one position to another position, a source of fluid pressure different from atmosphere, [a] fluid motor *means* operably connected *to said power train* to cause the alternate operativeness of the other two speed drives, control means for said motor *means* comprising control valving, means for conditioning the control means to cause operation of said motor *means* after said one speed drive has been rendered operative, and means for neutralizing said one speed drive when either of the two other speed drives is rendered operative by an operation of said motor *means.*

20. In a control mechanism for a change-speed transmission having a power train for providing at least three different forward speed drives and manually-controlled means whereby one speed drive of said power train is rendered operative by moving a shift-lever from one position to another position, a source of fluid pressure different from atmosphere, [a] fluid motor *means* operably connected to said [source] *power train* to cause the alternate activation of the other two speed drives when said shift-lever is moved to a third position, control means for said motor *means* comprising control valving, means for conditioning said control means for operation to cause said motor *means* to operate after the activation of said one speed drive in response to the aforesaid manual inauguration thereof, and for inhibiting such conditioning prior to such activation, said motor *means* inactivating the said one speed drive when either of the two other speed drives is activated, and *means for inactivating* [activating] any established speed drive under manual control when said shift-lever is returned to the said one position.

21. In an automotive power-transmitting system including an engine, a friction clutch actuatable by a clutch pedal, and a change-speed transmission provided with at least three different forward speed gear ratios establishable by gear sets controlled by two shiftable members having neutral positions, one of which is shiftable from its neutral position in one direction to establish low speed drive by the gear set thereof and the other of which is shiftable from its neutral position in opposite directions to establish second and high speed drives by the gear sets thereof, a hand-lever, means operable by a movement of said hand-lever from neutral position to cause the first-named shiftable member to be manually moved to place the low speed drive gear set in operative condition while said clutch is disengaged, means controlled by a movement of said clutch pedal to an extreme position beyond a clutch-disengaged position, for causing said low speed drive gear set to be placed in neutral and said other shiftable member to be moved to cause the gear set of the second speed drive to be operative without additional movement of said hand-lever, means controllable by successive movements of said clutch pedal to a position within said extreme position, after said second speed ratio gear set is operative, for causing the gear sets of said high and second speed drives to be alternately operative also without any additional movement of said hand-lever, and means for neutralizing the gear sets of any of said speed drives by manual effort applied through said hand-lever.

22. In an automotive power-transmitting system comprising an engine, a friction clutch, and a change-speed gear transmission having means for establishing at least three different forward speed drives, together with manually-controlled means whereby one speed drive is established by moving a shift-lever from one position to another position, means comprising a fluid motor and control means therefore for causing the two other speed drives to be alternately established, a source of pressure fluid different from atmosphere, a selector valve means interposed between said source and said motor including a rotatable and axially reciprocable valve element having operative open and closed positions, means for rotating said valve element from one closed position to another closed position by the shift-lever when establishing the said one speed drive, means operable after said element has been rotated from said last-named closed position for moving said element axially to an open position to thereby accommodate operation of said fluid motor by its control means, and the establishing of one of said two other speed drives, and for mechanically disconnecting said shift-lever from said one speed drive of the transmission, means for neutralizing said one speed drive by operation of said fluid motor to establish one of said other two speed drives and without additional movement of said shift-lever, and means for neutralizing either of the said other two speed drives and rotating said valve element to its first closed position by return of said shift-lever to its said one position.

23. In a control mechanism for a change-speed transmission connected through an engageable and disengageable clutch to an internal-combustion engine, said transmission being provided with a first member shiftable from a neutral position to two positions for obtaining low and reverse speed drives and a second member shiftable to two positions through a neutral position for obtaining second and high speed drives, a shift-lever operably connected to manually shift said first member to its different positions, clutch-disengaging means, power-operated means controlled by said clutch-disengaging means when actuated to disengaged position for neutralizing low speed drive only and sequentially shifting said second member, shift-inhibiting control means for normally preventing operation of said power-operated means, and means operable when said low speed drive is rendered operative for releasing said inhibiting means to cause said power-operated means to be operated by subsequently actuating said clutch-disengaging means.

24. In an automotive power-transmitting system comprising an engine, a friction clutch, and a change-speed device having enmeshable drive-connections for establishing at least three forward speed drives and a reverse speed drive, and actuatable shifting means therefor: A shift-lever movable from a neutral position to another position to actuate said shifting means for establishing by manual effort one of the speed drive connections, power-operated means comprising a fluid motor having a movable element operated by differential fluid pressure oppositely acting thereon for establishing either of the connections of the other two speed drives, a source of differential fluid pressure, control means including valve means regulating the differential fluid pressure to effect establishment of the connections of said two speed drives independently of a return movement of said shift-lever to any position occupied prior to manual establishment of the said one speed drive, means for rendering the gear sets of said one speed drive inoperative when either of the other two speed drives is established, and means for fully neutralizing the gearing at will by a manual effort and without fluid power operation of the movable element of the power means when said shift-lever is returned to its neutral position.

25. In a control mechanism for a change-speed transmission having a power train providing a first speed drive and at least two higher speed drives, a shift-lever movable to an adjusted position for operatively establishing said first speed drive solely by manual effort, a control pedal movable from a first position to a second position, means comprising power means and control means therefor for causing said higher speed drives to be selectively established upon successive aforementioned movement of said pedal without return of said shift-lever to its position corresponding to disestablished condition of said first speed drive, and means for rendering said first speed drive ineffective prior to said higher speed drive being rendered effective without manual effort being exerted on said shift-lever.

26. In a control mechanism for a change-speed transmission having a power train providing a first speed drive and at least two higher speed drives, a shift-lever movable to an adjusted position for operatively establishing said first speed drive solely by manual effort, a control pedal movable from a first position to a second position, means comprising power means and control means therefor for causing said higher speed drives to be selectively established upon successive aforementioned movements of said pedal without return of said shift-lever to its position corresponding to disestablished condition of said first speed drive, means for rendering said first speed drive ineffective prior to said higher speed drives being rendered effective without manual effort being exerted on said shift-lever, and means operable upon return of said shift-lever to its initial position to cause any established speed drive to be neutralized.

27. In a control mechanism for a transmission having a power train providing at least three different forward speed drives including enmeshable first speed drive gears, and means for establishing second and third speed drives, a shift-lever movable from a first to a second position, means operated by movement of said shift-lever to said second position to enmesh said first speed drive gears, mechanism including a control pedal and a power means energized under control thereof, means operated by said mechanism, upon movement of said pedal after enmeshing of said first speed gears, to demesh said first speed drive gears and selectively thereafter to render operative the second and third speed drives, said means being operable without additional movement of the shift-lever.

28. In a control mechanism for a transmission having a power train providing at least three different forward speed drives including a first, a second, and a third speed drive, a shift-lever movable from a first to a second position, means operated by movement of the shift-lever to its second position to render operative said first speed drive, mechanism including a control pedal and a power means energized under control thereof, limiting control means effective to prevent operation of said mechanism, means actuated only after operation of said means rendering operative said first speed drive to cause said limiting means to be ineffective, means operated by said mechanism upon successive aforementioned movements of said control pedal, after operativeness of said first speed drive, to render inoperative said first speed drive and selectively thereafter to render operative said second and third speed drives.

29. In a control mechanism for a transmission having a power train providing at least three different forward speed drives including a first, a second, and a third speed drive, the combination of a shift-lever member movable from a first to a second position, operating means connected therewith to render effective said first speed drive upon movement of said manual member to its second position, mechanism including a power means and a control pedal therefor interconnectable with said operating means for operation thereby, drive-governing means comprising limiting [any] *and* selective control means initially preventing operation of said mechanism by movement of said operating means and said control pedal, means operated by the rendering effective of said first speed drive to cause said drive governing means to be ineffective in part, and means operated by said mechanism upon operations of the operating means and said control pedal, subsequent to effectiveness of said first speed drive and thereafter render effective said second and third speed drives according to predetermined conditions of the effective part of said drive-governing means.

30. In a vehicular power-transmitting system comprising an engine, a frictional clutch, and a change-speed transmission having enmeshable members to establish a first and a second speed, and enmeshable members to establish a third speed, a manual member movable from a first position to a second position, connections between said manual member and one of said first speed members to displace the latter into mesh with another first speed member and thereby establish first speed drive upon movement of said manual member from its first to its second position, mechanism including power means and a control member therefor, means operated by the control member without additional movement of said manual member to selectively establish the enmeshment of said second and third speed members, said means having devices to enmesh each selected one of said second and third speed members and to demesh the other one of said second and third speed members, and means to render the first speed members ineffective to interfere with the second and third speed members without moving said manual member.

31. In a control means for a variable-drive transmission having a power train providing a first speed drive and a second speed drive and operating means therefor, a shift-lever for actuating said operating means to render *said* first speed drive effective, power-operated means for actuating said operating means *to dis-establish said first speed drive and* to render effective said second speed drive, a control pedal movable to a first position and a second position, control mechanism for said power-operated means including means operated by movement of said pedal from said first to second position to cause said power-operated means *to dis-establish said first speed drive and* to establish said second speed drive, and drive-inhibiting means to prevent said power-operated means from thus establishing said second speed drive when said shift-lever is operated to establish said first speed drive.

32. In a control means for a variable-drive transmission having a gear train providing a first speed drive and a second speed drive, means for rendering effective said first speed drive, a control member operable into first and second positions, and normally operable from second to first position during said establishment of said first speed drive, power-operated means *to dis-establish said first speed drive and* to render effective said second speed drive, control mechanism for said power-operated means, including means to cause said power-operated means *to dis-establish said first speed drive and* to establish said second speed drive when said control member is operated from said second to first position, and power-shift disabling means to prevent said power-operated means from thus establishing said second speed drive when said means to establish said first speed drive is operated and said control member is also operated from said first to second position.

33. In a control for a variable-drive transmission having a power train providing at least two different forward speed drives, means to establish one of said speed drives, power-operated means including a pedal movable *to dis-establish one of said drives and* to establish the other of said two speed drives, and drive-inhibiting means effective to prevent operation of said power means *to dis-establish said one speed drive and* to render effective said other speed drive prior to operation of said first-named means and the actual resulting drive effectiveness of said first speed drive, despite movement of said pedal.

34. In a control for a variable drive transmission having a power train providing at least two different separately activatable forward speed drives, means to establish one of said speed drives, power-operated means including a pedal movable into first and second position *to dis-establish said one speed drive and* to establish [a second] *the other* of said speed drives, means operated only after operation of said first-named means and activation of said first speed drive to condition said power-operated means for operation, and additional means to complete operation of said power-operated means.

35. In a control means for a change-speed drive transmission having a power train providing a plurality of different separately activatable forward speed drives and with which is associated torque relieving means, a pedally-movable member operable for relieving the torque, means to activate a first speed drive of said power trains, power means to *inactivate said first speed drive and to* activate a second speed drive of said power trains, control mechanism for said power means including said pedally-movable member, drive-limiting means for normally preventing operation of said power means, means for disabling said drive-limiting means upon predetermined movement of said pedally-movable member to accommodate functioning of said power means at will to *inactivate said first speed drive and to* activate said second speed drive, said pedally-movable member being operable to [cause] *enable* activation of said first speed drive during *torque* relief without disabling said preventing means.

36. In a control means for a change-speed drive transmission having a power train providing a plurality of different separately activatable forward speed drives and with which is associated torque relieving means, power means operably connected to operate the transmission to change the speed drives, control means for the power means comprising a pedal movable to a predetermined position from a first position for causing *torque relief* and the power means to [function *operatively* and a] change [in] *the transmission* speed drive [to take place], a drive-limiting means for preventing said control means for said power means from causing said power means to operate, and means for disabling the preventing means at will by a movement of said pedal to a position beyond the said predetermined position necessary in causing said power means to operate during changing of said drives.

37. In a control means for a change-speed drive transmission having a power train providing a plurality of different separately activatable forward speed drives and with which is associated torque relieving means, a manually-movable member, means operable by said member when moved from one position to another position for activating a speed drive by operating the transmission, power-operated mechanism for activating at least two other speed drives including control means therefor, means actuated by said manually-movable member when moved to a supplemental position different from said one position and said other position for conditioning said power means and operation, means for neutralizing any active speed drive when said manually-movable member is returned to its said one position, and means for predetermining which of said other two speed drives will be activated upon initial functioning of said power-operated means whenever said manually-movable member is at or returned to its said one position.

38. In a control means for a change-speed drive transmission having a power train providing a plurality of different separately activatable forward speed drives and with which is associated torque relieving means, power-operated mechanism for activating a speed drive, control means for said power-*operated* [operating] mechanism comprising a pedal movable from a first position to a second position and return for causing said power-operated mechanism to function and activate said power-operated speed drive *during torque relief*, a shift-lever for activating a speed drive other than said first-named speed drive *during torque relief*, drive-limiting control means for preventing said power-operated mechanism from functioning to activate the power-operated speed drive to thereby provide for the other speed drive to be activated and actually drive effective, and means controlled by the placing of said shift-lever in a predetermined position other than its first position for disabling said drive limiting means.

39. In a control means for a change-speed drive transmission having a power train providing a plurality of different separately activatable forward speed drives and with which is associated torque relieving means, power-operated mechanism for activating a speed drive, control means for said power-operated mechanism comprising a pedal movable from a *first* [fist] position to a second position and return for causing the power-operated mechanism to function and activate the power-operated speed drive *during torque relief*, a shift-lever for activating a speed drive other than said first-named speed drive *during torque relief*, drive-governing means for preventing the power-operated mechanism from functioning to activate the power-operated speed drive to thereby provide for the other speed drive to be rendered active, means controlled by the placing of said pedal in a predetermined position other than first position for disabling said drive-governing means, and means under the control of said shift-lever for neutralizing by manual effort any active speed drive.

40. In a control means for a power transmission having a gear train providing activatable first speed and second speed gear drives a manually-movable shift lever movable from a first position to another position, and from the said other position directly to a position supplemental thereto, means operated by movement of said shift-lever to the said another position to activate said first speed drive, power means operable to activate said second speed drive, means operated by movement of said manual lever to its supplemental position after first speed drive has been activated to pre-condition said power means to operate, and [and] additional means to complete operation of said power means.

41. In a control means for a power transmission having a gear train providing activatable first speed and second speed drives, a manually movable shift-lever movable from a first position to another position, and from the said other position directly to a position supplemental thereto, means operated by movement of said shift-lever to the said another position to activate said first speed drive, power means operable to activate said second speed drive, means operated by movement of said manual lever to its supplemental position after first speed drive has been activated to pre-condition said power means to operate, additional means to complete operation of said power means, and means operable by return of said shift-lever to its first position to neutralize any active speed drive by manual effort.

42. In a control means for a power transmission having a gear train providing activatable first speed and second speed drives, a manually movable shift-lever operatively connected to said transmission for activating said first speed drive by a movement of said manual lever from a first position to another position, power-operated means for activating said second speed drive, means for controlling operation of said power-operated means, means for pre-conditioning said power-operated means for operation after said first speed drive is activated, means for operating said pre-conditioning means by a supplemental movement of said shift-lever from its other position but without return to its first position, and means for rendering inoperative the operative connection by said shift-lever to the transmission by said supplemental movement.

43. In a control mechanism for a change-speed power transmission having a power train providing means for rendering active at least three different forward speed drives thereof, a shift-lever movable from a first to another position, shifting means operated by movement of said lever to the said another position to cause one of said speed drives to be activated, power-shifting mechanism including a control pedal actuatable between a first and a second position and power means energized under control thereof, means inhibiting operation of said power-shifting mechanism during actuations of said pedal as aforesaid, means actuated by the operation of said shifting means after said first speed drive has been activated for rendering said inhibiting means ineffective, means operated by said power-shifting mechanism upon successive cycles of said pedal from its first to its second position and return after said inhibiting means has been rendered ineffective for sequentially causing said one speed drive to become inactive and said second and third speed drives selectively activated under the control of said pedal.

44. In a control for change-speed transmissions having a power train actuatable to provide a plurality of different forward speed drives, a shift-lever having a neutral position common to all of said speed drives and being manually movable from said neutral position to an operating position to activate one of said speed drives, said shift-lever having a supplemental movement from said operating position, power-shifting mechanism for rendering inactive said one speed drive and causing a different one of said speed drives to be activated, including a control pedal movable from a first to a second position and return and operable independently of said shift-lever, means rendered operative by said supplemental movement of said lever and movement of said pedal from its first to its second position and return to actuate said shifting mechanism for effecting neutralization of the one speed drive and causing a different speed drive to be operative without movement of said shift lever from its supplemental position setting, and means for neutralizing any active speed drive at will by a return of said shift-lever to its said common neutral position.

45. In a control for a change-speed transmission having a power train actuatable to provide a plurality of different forward speed drives, a shift-lever having a neutral position common to all of said speed drives and being manually movable from said neutral position to an operating position to activate one of said speed drives, said shift-lever having a supplemental movement from said operating position, power-shifting mechanism for rendering inactive said one speed drive and causing a different one of said speed drives to be activated, including a control pedal movable from a first to a second position and return and operable independently of said shift-lever, means rendered operative by said supplemental movement of said lever and movement of said pedal from its first to its second position and return to actuate said shifting mechanism for effecting neutralization of said one speed drive and causing a different speed drive to be operative without movement of said shift-lever from its supplemental position setting, and means for neutralizing an active speed drive at will by a return of said lever to its said common neutral position.

46. In a control means for a change-speed power transmission having a power train actuatable to provide a plurality of different forward speed drives, power-operated mechanism for alternately activating two of said speed drives, control means for said power-operated mechanism comprising a pedally-actuated member movable from a first position to a second position for causing said power-operated mechanism to function and produce an alternate activation of said two speed drives, means for preventing the power-operated mechanism from functioning under certain conditions, and means for disabling said preventing means by movement of said member to a predetermined position.

47. In a control means for a change-speed power transmission having a power train operable to provide a plurality of different forward speed drives, power-operated mechanism for alternately activating two of said speed drives, control means for said power-operated mechanism comprising a pedally-actuated member movable from a first position to a second position for causing said power-operated mechanism to function and alternately activate said two speed drives, a manual member, means for establishing a speed drive other than said first-named two speed drives solely by movement of said manual member, means for preventing said power-operated mechanism from functioning to activate a speed drive of said first-named two speed drives, and means controlled by the placing of said manual member in a predetermined position for disabling said preventing means.

48. In a control means for a change-speed power transmission having a power train operable to provide a plurality of different speed drives, means comprising a shift-lever and means operatively connected thereto for activating a first of said speed drives, power-operated means including a member pedally-movable sequentially into first and second positions to establish a second of said speed drives, means operable after operation of said shift-lever to activate said first speed drive to condition said power-operated means for operation, additional means to complete operation of said power-operated means, means operable by said power-operated means to inactivate said first speed drive prior to activation of said second speed drive, and means for disabling the operative connection of said shift-lever so that no attendant movement of said shift lever will be produced when said first speed drive is inactivated by said power-operated means.

49. In an automotive power-transmitting system comprising an engine, a friction clutch, and a change-speed device having enmeshable drive-connections for establishing three forward speed drives and a reverse speed drive, and actuatable shifting means therefor: a shift-lever; a control pedal; energizable power-operated means to operate said shifting means; means for energizing said power means including said pedal; means including said shift-lever movable from a first position to a second position to cause operation of said shifting means to establish a first of said speed drives; and said shifting means being operable upon energization of said power means to change the transmission drive from said first speed drive to second and third speed drives by no additional manual action or movement otherwise of said shift-lever, the aforesaid changing means including drive-governing mechanism responsive to establishment of said first speed drive and required to be operated, prior to effecting of such speed drive changes, by the shift lever positioned in its second position in the aforesaid operation of causing establishment of first speed ratio, and the aforesaid changing means also including power control means controlled by said pedal when said governing mechanism is operated, the cooperation of said governing mechanism and said power control means being required for causing said power-operated means to operate to effect said successive changes in the effective transmission drives, and means associated with said governing mechanism to predetermine which of said second and third speed drives the operation of said power means will establish in the transmission when operated.

50. In an automotive power-transmitting system comprising an engine, a friction clutch, and a change-speed device having enmeshable drive-connections for establishing three forward speed drives and a reverse speed drive, and actuatable shifting means therefor: a shift-lever; a control pedal; energizable power-operated means to operate the shifting means; means for energizing said power means including said pedal; means including said shift-lever movable from a first position to a second position to cause operation of said shifting means to establish a first of said speed drives; and said shifting means being operable upon energization of said power means to change the transmission drive from said first speed drive to second and third speed drives by no additional manual action or movement otherwise of said shift-lever, the aforesaid changing means including drive-governing mechanism responsive to establishment of said first speed drive and required to be operated, prior to effecting of such speed drive changes, by said shift-lever positioned in its second position in the aforesaid operation of causing establishment of first speed drive, and the aforesaid changing means also including power control means controlled by said pedal when the said governing mechanism is operated, the cooperation of said governing mechanism and said power control means being required for causing said power-operated means to operate to effect said successive changes in the effective transmission drives, and means associated with said governing mechanism to predetermine which of said second and third speed drives the operation of said power means will establish in the transmission when operated, said shifting means including means to render said first speed drive ineffective automatically when said power means is energized to render second and third speed drives effective automatically.

51. In control mechanism for a change-speed transmission having a power train operable to provide different forward speed drives and operating means therefor, including power-energizable means; a shift-lever, said operating means being rendered operable by a movement in one direction only of said lever from a first to a second position for controlling certain of said drives to render the same operative, said power-energizable means being energized by a power source upon movement of said lever in a different direction to a third position for controlling others of said drives to render the same selectively operative, and means operable by said power-energized means for rendering inoperative, if operative, said first-named drive prior to selectively rendering [additional] *said other* drives operative.

52. In a control mechanism for a change-speed transmission having a power train operable to provide different forward and a reverse speed drive and operating means therefor, including power-energizable means and a source of power therefor, a manually operated shift-lever, means operable by movement in one direction only of said shift-lever from a first to a second position for causing a first speed forward drive to be established, said power-energized means being rendered operative by movement of said shift-lever to a third position in a different direction from said second position for causing others of said forward drives to be rendered selectively operative, said operating means being actuated by said power-energized means for rendering the first speed drive, if operative, inoperative prior to the controlling of said other drives, and said operating means being responsive to movement of said shift-lever in a direction opposite to its direction of movement from its said first to its said second position to cause the aforesaid others of said drives to be inoperative and to render operative said reverse drive.

53. In a control for a change-speed drive mechanism having means for coupling a driving shaft to a driven shaft to provide a plurality of different forward and reverse drive connections and actuatable operating means therefor including power-energizable means and a source of power therefor, a movable pedal, a shift-lever movable in one direction only from a first to a second position for effecting actuation of said operating means to establish a first of said forward drive connections, movement of said shift-lever to a third position in a direction different from the direction of movement of said shift-lever to said second position from said first position effecting actuation of said operating means to condition for establishment of a plurality of other forward drive connections, said last-named movement of said shift-lever also conditioning said first drive connection for disestablishment, said operating means being actuatable to selectively establish said plurality of drive connections, upon operation of said pedal, and to disestablish said first drive connection, and said operating means being responsive to movement of said shift-lever in a direction opposite to its direction of movement from its first to its second position to render the aforesaid drive connections inoperative and to render said reverse drive connection operative.

54. In a control mechanism for a change-speed mechanism having a gear train operably providing a plurality of different forward and reverse speed drives and operating means for activating said speed drives; a shift-lever movable in one direction only from a first to a second position, movable into a different direction to a third position, returnable from each of said second and third positions to said first position by movement in a direction opposite to the direction of movement of said shift-lever from said first position to said second position, and movable in said opposite direction beyond said first position to a fourth position; means operable by shift-lever movement from said first position to said second position for actuating said operating means to activate a forward speed drive, and speed-drive-activating fluid-pressure means, including a source of fluid under pressure and fluid-pressure actuated motor means vented to said source; control means for said last-mentioned means responsive to movement of said shift-lever to said third position for actuating said fluid pressure means to selectively activate others of said forward speed drives through said operating means; means also actuated by said fluid pressure means for causing the manually-activated speed drive, if active, to become inactive prior to activation of said other speed drives; means responsive to positioning of said shift-lever in its said first position to render said fluid pressure means inoperative to activate any of said speed drives, with return movement of said shift-lever to said first position from either of its other positions inactivating any speed drive then active; and manually-controlled means responsive to movement of said shift-lever to its fourth position from said first position to cause the aforesaid speed drives to remain inactivated and to cause said reverse speed drive to be activated.

55. In a control for change-speed automotive transmissions having a power train operable to provide at least three forward drive speeds between a driving shaft and a driven shaft, and operating means thereof: a manual member; a pedal member; energizable power-operated means to operate the transmission mechanism through said operating means; means for energizing said power means; and means including said manual member manually movable from a first position to an additional position to actuate said operating means for activating a first of said speeds; said operating means being operable upon energization of said power means to change the transmission drive from the first speed to a second speed and to a third speed by no additional manual action or movement otherwise of said manual member, except operation of said pedal member; the aforesaid energizing means including a drive-governing mechanism responsive to activation of said first speed drive, the activation of first speed drive being required prior to the power means effecting such speed changes, and said energizing means also including power control means operated by predetermined movements of said pedal member when said governing mechanism is operated, the cooperation of said governing mechanism and said power control means causing said power-operated means to operate to effect said speed changes in the transmission drives; and means associated with said governing mechanism to predetermine which of second and third speeds the operation of said power means will activate in the transmission when operated.

56. In a control for change-speed automotive transmissions having a power train operable to provide at least three forward drive speeds between a driving shaft and a drive shaft, and operating means therefor: a manual member; a pedal member; energizable power-operated means to operate the transmission mechanism through said operating means; means for energizing said power means; and means including said manual member manually movable from a first position to an additional position to actuate said operating means for activating a first of said speeds; said operating means being operable upon energization of said power means to change the transmission drive from the first speed to a second speed and to a third speed by no additional manual action or movement otherwise of said manual action or movement otherwise of said manual member, except operation of said pedal member; the aforesaid energizing means including speed-governing mechanism responsive to activation of said first speed drive, the activation of first speed drive being required prior to the power means effecting such speed changes and said energizing means also including power control means operated by predetermined movements of said pedal member when said speed-governing mechanism is operated, the cooperation of said governing mechanism and said power control means causing said power-operated means to operate to effect said speed changes in the transmission drives; means associated with said governing mechanism to predetermine which of said second and third speeds the operation of said power means will activate in the transmission when operated; said power train also including enmeshed gears selectively changeable from inactive to active conditions to establish said speeds, and means to change automatically said first speed to a non-active condition prior to establishment of any of the others of said drives.

57. In a control for change-speed automotive transmissions having a power train operable to provide at least three forward drive speeds between a driving shaft and a driven shaft, and operating means therefor: a manual member; a pedal member; energizable power-operated means to operate the transmission through said operating means; means for energizing said power means; and means including said manual member manually movable from a first position to an additional position to actuate said operating means for activating a first of said speeds; said operating means being operable upon energization of said power means to change the transmission drive from the first speed to a second speed and to a third speed by no additional manual action or movement otherwise of said manual member, except operation of said pedal member; the aforesaid energizing means including speed-inhibiting mechanism responsive to activation of said first speed drive, the activation of first speed drive being required prior to the power means effecting such speed changes and said energizing means also including power control means operated by predetermined movements of said pedal member when said inhibiting mechanism is operated, the cooperation of said inhibiting mechanism and said power control means causing the power-operated means to operate to effect said speed changes in the transmission drives; speed-selecting means to predetermine which of said second and third speeds the operation of said power means will activate in the transmission when operated; and neutralizing means actuated by said power-operated means to render said first speed drive ineffective prior to selective establishment of said second and said third speed drives.

58. In a control for change-speed automotive transmissions having a power train operable to provide at least three forward drive speeds between a driving shaft and a driven shaft, and operating means therefor: a manual member; a pedal member; energizable power - operated means to operate the transmission mechanism through said operating means; means for energizing said power means; and means including said manual member manually movable from a first position to an additional position to actuate said operating means for activating a first of said speeds; said operating means being operable upon energization of said power means to change the transmission drive from the first speed to a second speed and to a third speed by no additional manual action or movement otherwise of said manual member, except operation of said pedal member; the aforesaid energizing means including drive-limiting mechanism responsive to activation of said first speed drive, the activation of first speed drive being required prior to the power means effecting such speed changes and said energizing means also including power control means operated by predetermined movements of said pedal member when said limiting mechanism is operated, the cooperation of said limiting mechanism and said power control means causing the power-operated means to operate to effect said speed changes in the transmission drives; drive-selecting means to predetermine which of said second and third speeds the operation of said power means will activate in the transmission when operated, and means responsive to movement of said shift-lever for inactivating an active one of said drives whenever the said shift-lever is returned to its said first position.

59. In automatic change-speed transmissions having a power train providing activatable low, intermediate and high speed forward drives and a neutral non-driving condition thereof, and operating means therefor; fluid pressure speed-changing means having pressure responsive means operable in response to delivery of pressure fluid to said fluid pressure means from a source of pressure different from atmosphere, and means operatively connecting said pressure responsive means to said operating means; a manually operated shift-lever movably settable in a first, a second, and a third position; a pedal having an operating range of movement between two extreme positions; a control valve interposed between said source and said fluid pressure means and responsive to movement of said pedal; shift-control means including a selector valve interposed between said source and said control valve and operable to accommodate effectiveness of said control valve after said shift-lever is set in its third position to cause operation of said fluid pressure means, said shift-lever being effective upon movement of said shift lever from its first to its second position to cause solely the activation of said low speed drive, while said pedal is positioned in one of its extreme positions, said shift-lever being operable from its second position to its third position independently of said pedal and said control valve to effect transition from low speed to intermediate speed drive solely by said fluid pressure means after low speed has been first activated as aforesaid, and said pedal being operable independently of said shift-lever and said selector valve after said shift-lever has been positioned in its said third position to effect transition from intermediate speed to high speed drive solely by said fluid pressure means.

60. In automatic change-speed transmissions having a power train providing activatable low, intermediate and high speed forward drives and a neutral non-driving condition thereof, and operating means therefor; speed-changing means having a movable actuating element, and means operatively connecting said actuating element to said operating means; a manually operated shift-lever movably settable in a first, a second, and a third position; a pedal having an operating range of movement between two extreme positions; a first control element responsive to movement of said pedal; a second control element *actuatable* [actuated after a speed drive is activated] to accommodate operation of said speed-changing means *when said first control element is moved*, said shift-lever being effective upon movement from its first to its second position to cause the activation of said low speed drive, while said pedal is positioned in one of its extreme positions, said shift-lever being operable from its second position to its third position independently of [said] pedal-*movement of* [and] said first control element to effect transition from low speed to intermediate speed drive [solely] by actuating said second control element [after low speed has been first activated as aforesaid,] and *moving* said pedal being operable thereafter independently of said shift-lever and said second control element after said shift-lever has been positioned in its said third position to cause transition from intermediate speed to high speed drive solely [by said movable actuating element] *in response to movement of said first control element.*

61. In automatic change-speed transmissions having operably enmeshable gear sets for establishing a low, intermediate and high speed forming drive and a neutral non-driving condition thereof, and operating means therefor; fluid pressure speed-changing means having pressure responsive means operable in response to delivery of pressure fluid to said fluid pressure means from a source of pressure different from atmosphere, and means operatively connecting said pressure responsive means to said operating means; a manually operated shift-lever movably settable in a first, a second, and a third position; a depressible pedal having an operating range of movement toward and from an extreme position; a shift-control valve interposed between said source and said fluid pressure means and responsive to depression of said pedal; a selector valve interposed between said source and said control valve and operable to accommodate effectiveness of said control valve to cause operation of said fluid pressure means; said shift-lever being effective upon movement of the same from its first to its second position to cause the establishment of said low speed gear set, while said pedal is positioned in its extreme position; said shift-lever being operable from its second position to its third position independently of said pedal and said control valve to effect transition from low speed to intermediate speed drive solely by said fluid pressure means after low speed has been first established as aforesaid, and said pedal being movable after said shift-lever has been positioned in its said third position to cause alternate establishment of intermediate speed and high speed drive solely by actuation of said fluid pressure means without displacing said shift lever out of its aforesaid third position.

62. In a control for a change-speed automotive transmission having a power train providing at least three forward speed drives, including low, intermediate and high speed drives and operating means therefore; energizable power-operated means for operating said operating means; means for energizing said power-operated means; a shift-lever movably settable in a plurality of positions including a drive range position at which said intermediate and said high speed drives normally are conditioned for activation upon actuation of said power means after prior activation of low speed drive; a pedal actuatable to a pair of extreme positions and to a different position between said extreme positions; a first control element operable only after low speed drive is activated to condition the power means for alternately activating intermediate and high speeds; a second control element operable in response to pedal movement to cause said power means to operate when so conditioned by said first control means; shift-control means actuated by said lever when in a position other than said drive-range position to render said power means ineffective to operate said operating means; means actuated by said power means to normally render said low speed ineffective when said lever is positioned in its drive-range position; and means responsive to movement of said lever from its drive-range position and movement of said pedal to its said different position to cause said last-mentioned means to be inoperative despite later positioning of said lever in its drive-range position, whereby low speed drive can be rendered operative even though said lever is subsequently positioned in its drive-range position.

63. In a control for change-speed automotive transmissions having selective drive-mechanism providing at least three forward drive speed ratios, including low, intermediate, and high speed drives and operating means therefor; energizable power-operated means to operate said operating means; means for energizing said power-operated means; a shift-lever movably settable in a plurality of [positioning] *positions* including a drive-range position at which said intermediate and said high speed drives normally are conditioned for alternate establishment upon actuation of said power means; a pedal depressible to a predetermined operating position; a first control element operable only when said lever is in its drive-range position to condition the power means for alternately establishing intermediate and high speeds; a second control element operable in response to pedal depression to cause said power means to operate when so conditioned by said first control means; means actuated by said lever when in a position other than said drive-range position to render said power means ineffective to operate said operating means; means actuated by said power means to normally render said low speed ineffective when said lever is positioned in its drive-range position; and means responsive to movement of said lever from its drive-range position and depression of said pedal to its said predetermined operating position to cause said last-mentioned means to be inoperative despite later positioning of said lever in its drive-range position, whereby low speed drive can be rendered operative even though said lever is subsequently positioned in its drive-range position.

64. In a control for change-speed automotive transmissions having selective drive-mechanism providing three different forward drive speeds between a driving shaft and a driven shaft, and operating means therefor; a shift-lever; a first shifting mechanism actuatable in response to movement of said shift-lever for establishing at least one of said speeds; a second shifting mechanism for establishing the others of said speeds; energizable power means for actuating said second shifting mechanism; means controlled by said shift-lever for energizing said power means; and locking means for inhibiting energization of said power means despite movement of said shift-lever prior to movement of said shift-lever to actuate said first shifting mechanism.

65. In a control for change-speed automotive transmissions having selective drive-mechanism providing three different forward drive speeds between a driving shaft and a driven shaft, and operating means therefor: a shifter shaft; a pair of shifter arms normally independently rotatable to establish said speed drives; the shaft being rotatably and axially movable [relative] *relatively* to the arms; a notch in each of said arms; said notches being registerable when a speed drive is established by movement of one of said arms; and a cross-pin carried by and movable with said shaft for selective entry into said notches, said cross-pin operatively connecting said shaft with one of said arms for the establishment of one of said drives when said shaft is rotated, and said pin being movable upon axial movement of the shaft while said one of said drives is established to condition the other of said arms for *rotation to enable establishment of* [establishing] another of said drives.

66. In a control for change-speed automotive transmissions having selective drive-mechanisms providing three different forward drive speeds between a driving shaft and a driven shaft, and operating means therefor: a shift-lever movable in two parallel rotational planes and axially therebetween; a shifter shaft movable both rotatably and axially with said lever; a pair of shifter arms selectively movable rotatably to establish said speed drives and having facing notches registerable whenever a drive is established therethrough; and a cross-pin fixedly carried by said shaft for movement therewith and enterable into said notches; said cross-pin being enterable into a notch [by] *of* one of said arms for establishing a co-rotational movement of said shift-lever and said one of said arms to effect establishment of at least one of said drives and said cross-pin being displaceable from the aforesaid notch and enterable into the registering notch of the other of said arms after the aforesaid co-rotational movement to condition said other of said arms for rotational movement independently of said one of said arms upon subsequent movement of said shift-lever to establish another of said drives without disturbing the rotated position of said one of said arms.

67. In change-speed transmissions having drive-mechanism actuatable to activate low, intermediate and high speed forward drives and fluid-pressure energizable servo-mechanism for actuating said drive mechanism; a manual selector-lever movably settable in a first, a second, and a third position, a pedal having an operating range of movement between two extremes, *means operable in response to movement of said selector-lever from first to second position for activating only low speed drive upon operating said pedal to one of its extremes*, control means including valving means controlled by said pedal and operable to control energization of said servo-mechanism, *a source of pressure fluid production different from atmosphere, selecting means operable to predetermine servo-activation of intermediate and high speed drives and normally selecting intermediate speed drive*, means effective to inhibit *servo*-activation of intermediate and high speed drives when said selector-lever is moved from its first to its second position [to cause the activation of low speed drive while said pedal is positioned at one of its extremes,] and *including* a control element operable *by said selector-lever* [irrespective of the] *without* operating [condition of] said pedal *from said one extreme* to cause transition from low speed to intermediate speed drive by said servo-mechanism in response [solely] to movement of said selector-lever from said second position to its third position *with intermediate speed drive selected to operably enable said control means to energize said servo-mechanism*, said control means being operable to cause transition from intermediate to high speed drive by said servo-mechanism in response to movement of said pedal *to operably enable said control means to cause energization of said servo-mechanism with high speed drive selected* without displacing said selector-lever out of its third position setting.

68. A change-speed transmission according to claim 67 in which said means operable by said selector-lever in effecting transition from low speed to intermediate speed drive comprises a valve element movable with said selector-lever to a plurality of *fluid*-control positions.

69. A change-speed transmission according to claim 67 in which said first position of said selector-lever is a neutral drive mechanism position and in which movement of said selector-lever into first position causes inactivation of an active speed drive and disabling of said servo-mechanism.

70. A change-speed transmission according to claim 67 in which said second position of said selector-lever is effective to activate low speed drive only, and in which movement of said selector-lever from said second position to its third position is effective to [cause] *enable* power-transition of the drive-mechanism from low speed drive to intermediate drive, with subsequent power-transition to high speed drive *and alternately between intermediate and high speed drives* being obtainable without selector-lever movement.

71. In change-speed transmissions having drive-mechanism actuatable to activate low, intermediate, and high speed forward drives, and fluid-pressure energizable servo-mechanism for actuating said drive-mechanism to activate intermediate and high speed drives and to inactivate low speed drive; a manual selector-lever movably settable in a first, a second, and a third position, setting of said selector-lever in said second position activating low speed drive; a pedal; control means including valving means controlled by said pedal and operable to control energization of said servo-mechanism; selective governing means [effective] *operable* to predetermine activation of intermediate and high speed drives by said servo-mechanism when said selector-lever is set in its third position; *operating means for said governing means;* a control element movable with said selector-lever, irrespective of the operating condition of said pedal, to cause transition from low speed to intermediate speed drive by said servo-mechanism in response [solely] to the aforesaid setting of said selector-lever in its third position, *selection of intermediate speed drive by operation of said governing means, and said control means operated*, said control means being operable to cause transition from intermediate to high speed drive by said servo-mechanism as predetermined by *operation of* said selective governing means without displacing said selector-lever from its third position setting.

72. In change-speed transmissions having drive-mechanism actuatable to activate low, intermediate, and high speed forward drives, and fluid-pressure energizable servo-mechanism operatively connected to a source of fluid under pressure for actuating said drive-mechanism to activate intermediate and high speed drives and to inactivate low speed drive; a manual selector-lever movably settable in a first, a second, and a third position, setting of said selector-lever in said second position activating low speed drive; a pedal; control means including valving means controlled by said pedal and operable to control energization of said servo-mechanism, selective governing means [effective] *operable* to predetermine activation of intermediate and high speed drives by said servo-mechanism when said selector-lever is set in its third position; *operating means for said governing means;* and a control valve operatively interposed between said servo-mechanism and said source of fluid under pressure and movable with said selector-lever, irrespective of the operating condition of said pedal to an open position to [cause] *enable* transition from low speed to intermediate speed drive by venting said servo-mechanism to said source in response [solely] to the aforesaid setting of said selector-lever in its third position *with intermediate speed drive selected and said control means operated to servo-energizing position*, said control means being operable to cause transition from intermediate to high speed drive by said servo-mechanism as predetermined by *operation of* said selective governing means without displacing said selector-lever from its third position setting, and manual return movement of said selector-lever to its said first position from its third position moving said control valve to a closed position to positively prevent venting said servo-mechanism to said source, whereby continued activation of the drive-mechanism by the servo-mechanism is inhibited.

73. In change-speed transmissions having drive-mechanism actuatable to activate low, intermediate, and high speed forward drives, and fluid-pressure energizable servo-mechanism for actuating said drive-mechanism to activate intermediate and high speed drives and to inactivate low speed drive; a manual selector-lever movably settable in a first, a second, and a third position, setting of said selector-lever in said second position activating low speed drive; a pedal actuatable to two extreme positions and therebetween; control means including valving means controlled by said pedal and operable upon pedal actuation to control energization of said servo-mechanism; selective governing means [effective] *operable* to predetermine activation of intermediate and high speed drives by said servo-mechanism when said selector-lever is set in its third position; *operating means for said governing means;* and a control element movable with said selector-lever, irrespective of the operating condition of said pedal, to cause transition from low speed to intermediate speed drive by said servo-mechanism in response [solely] to the aforesaid setting of said selector-lever in its third position *with intermediate speed drive selected and said control means operated to servo-energizing position*, said control means being operable to cause transition from intermediate to high speed drive by said servo-mechanism as predetermined by *operation of* said selective governing means without displacing said selector-lever from its third position setting, said control means also being operable upon subsequent actuation of said pedal to an extreme position and return to alternately activate intermediate and high speed drives without disturbing said third position setting of said selector-lever.

74. In change-speed transmissions having drive mechanism actuatable to activate and inactivate low, intermediate and high forward speed drives, and fluid-pressure energizable servo-mechanism for actuating said drive-mechanism to inactivate low speed drive and activate intermediate and high speed drives; a pedal having an operating range of movement between two extremes; a manual selector-lever movably settable in a first and a second position, said lever when moved to its said second position causing actuation of said drive-mechanism to activate low speed drive during an operating movement of said pedal between its extremes; control means including valving means controlled by said pedal and effective to cause actuation of said servo-mechanism; drive governing means [effective] *operable* to predetermine inactivation of said low speed drive and sequential activation of intermediate and high speed drives by said servo-mechanism; *operating means for said governing means;* and a control element movable with said selector-lever when moved to its aforesaid second position for rendering said control valving means effective to cause actuation of said servo-mechanism to effect transition from low speed drive to intermediate speed drive in response solely to an operating movement of said pedal to and from one of its extremes, said control means being effective to cause servo-transition from intermediate to high speed drive in response solely to further operating movement of said pedal between its said extremes without displacing said selector-lever from its second position setting.

75. In change-speed transmissions having drive-mechanism actuatable to activate and inactivate low, intermediate and high forward speed drives, and fluid-pressure energizable servo-mechanism for actuating said drive-mechanism to inactivate low speed drive and activate intermediate and high speed drives; a pedal having an operating range of movement between two extremes; a manual selector-lever movably settable in a first and a second position, said lever when moved to its said second position causing actuation of said drive-mechanism to activate low speed drive during an operating movement of said pedal between its extremes; control means including valving means controlled by said pedal and effective to cause actuation of said servo-mechanism; drive governing means [effective] *operable* to predetermine inactivation of said low speed drive and sequential activation of intermediate and high speed drives by said servo-mechanism; *operating means for said governing means;* a control element movable with said selector-lever when moved to its aforesaid second position for rendering said control valving means effective to cause actuation of said servo-mechanism to effect transition from low speed drive to intermediate speed drive in response solely to an operating movement of said pedal to and from one of its extremes, said control means being effective to cause servo-transition from intermediate to high speed drive in response solely to further operating movement of said pedal between its said extremes without displacing said selector-lever from its said second position setting; and means responsive to manual return movement of said selector-lever from its aforesaid second position to its said first position accompanied by movement of said pedal to an extreme position to inactivate an active speed drive, said last-mentioned means including neutralizing elements operative to actuate said drive-mechanism to inoperative condition, and the setting of said selector-lever in its first position moving said control element therewith so as to render said control valving ineffective to cause actuation of said servo-mechanism.

76. In change-speed transmissions having drive-mechanism actuatable to activate and inactivate low, intermediate and high forward speed drives, and fluid-pressure energizable servo-mechanism for actuating said drive-mechanism to inactivate low speed drive and activate intermediate and high speed drives; a pedal having an operating range of movement between two extemes; a manual selector-lever movably settable in a first and a second position, said lever when moved to its said second position causing actuation of said drive-mechanism to activate low speed drive during an operating movement of said pedal between its extremes; control means including valving means controlled by said pedal and effective to cause actuation of said servomechanism; drive governing means [effective] *operable* to predetermine inactivation of said low speed drive and sequential activation of intermediate and high speed drives by said servo-mechanism; *operating means for said governing means;* and a control element movable with said selector-lever when moved to its aforesaid second position for rendering said control valving means effective to cause actuation of said servo-mechanism to effect transition from low speed drive to intermediate speed drive in response solely to an operating movement of said pedal to and from one of its extremes, said control means being effective to cause servo-transition from intermediate to high speed drive in response solely to further operating movement of said pedal between its said extremes without displacing said selector-lever from its said second position setting.

77. In change-speed transmissions having drive-mechanism actuatable to activate and inactivate low, intermediate and high speed forward drives, and fluid-pressure energizable servo-mechanism for actuating said drive-mechanism to inactivate low speed drive and to activate intermediate and high speed drives; a pedal having an operating range of movement between two extremes; a selector-lever manually settable in a first and a second position, said lever when moved to its second position causing actuation of said drive-mechanism to activate low speed drive as an effective transmission drive during an operating movement of said pedal within its said extremes; control means including valving means controlled by said pedal and effective to inactivate said low speed drive by operation of said servo-mechanism; drive selective control means [effective] *operable* to predetermine sequential activation of intermediate and high speed drives by said servo-mechanism; *means for operating said selective control means;* a control element movable with said selector-lever when moved to its aforesaid second position for rendering said control valving means effective to cause actuation of said servo-mechanism to activate intermediate speed drive in response solely to an operating movement of said pedal to one of its extremes without the necessity of rendering low speed drive effective, said control means being effective to cause servo-transition from intermediate to high speed drive in response solely to further operating movement of said pedal between its extremes without displacing said selector-lever from its second position setting, whereby low speed drive may be selectively rendered operative and inoperative as an effective speed drive in accordance with the extent of operating movement of said pedal.

78. In change-speed transmissions having drive mechanism actuatable to activate and inactivate low, intermediate and high speed forward drives, and fluid-pressure energizable servo-mechanism for actuating said drive-mechanism to inactivate low speed drive and to activate intermediate and high speed drives; a pedal having an operating range of movement between two extremes; a selector-lever manually settable in a first and a second position, said lever when moved to its second position causing actuation of said drive-mechanism to activate low speed drive during an operating movement of said pedal within its said extremes; control means including valving means controlled by said pedal and effective to inactivate said low speed drive by operation of said servo-mechanism; drive selective control means [effective] *operable* to predetermine sequential activation of intermediate and high speed drives by said servo-mechanism; *means for operating said selective control means;* a control element movable with said selector-lever when moved to its aforesaid second position for rendering said control valving means effective to cause actuation of said servo-mechanism to activate intermediate speed drive in response solely to an operating movement of said pedal to one of its extremes without the necessity of rendering low speed drive effective, said control means being effective to cause servo-transition from intermediate to high speed drive in response solely to further operating movement of said pedal between its extremes without displacing said selector-lever from its second position setting, whereby low speed drive may be selectively rendered operative and inoperative as an effective speed drive in accordance with the extent of operating movement of said pedal; and means responsive to manual return movement of said selector-lever from its aforesaid second position to its said first position accompanied by movement of said pedal to an extreme position to inactivate an active speed drive, said last-mentioned means including neutralizing elements operative to actuate said drive-mechanism to inoperative condition, and the setting of said selector-lever in its first position moving said control element therewith so as to render said control valving ineffective to cause actuation of said servo-mechanism.

79. In change-speed transmission having drive-mechanism actuatable to activate and inactivate low, intermediate and high speed forward drives, and fluid-pressure energizable servo-mechanism for actuating said drive-mechanism to inactivate low speed drive and to activate intermediate and high speed drives; a pedal having an operating range of movement between two extremes; a selector-lever manually settable in a first and a second position, said lever when moved to its second position causing actuation of said drive-mechanism to activate low speed drive as an effective transmission drive during an operating movement of said pedal within its said extremes; control means including valving means controlled by said pedal and effective to inactivate said low speed drive by operation of said servo-mechanism; drive selective control means [effective] *operable* to predetermine sequential activation of intermediate and high speed drives by said servo-mechanism; *means for operating said selective control means;* a control element movable with said selector-lever when moved to its aforesaid second position for rendering said control valving means effective to cause actuation of said servo-mechanism to activate intermediate speed drive in response solely to an operating movement of said pedal to one of its extremes without the necessity of rendering low speed drive effective, said control means being effective to cause servo-transition from intermediate to high speed drive in response solely to further operating movement of said pedal between its extremes without displacing said selector-lever from its second position setting, whereby low speed drive may be selectively rendered operative and inoperative as an effective speed drive in accordance with the extent of operating movement of said pedal, and subsequent actuation of said pedal to an extreme position and return being effective to alternately activate intermediate and high speeds without disturbing said second position setting of said selector-lever.

80. In change-speed transmission having drive-mechanism actuatable to activate a plurality of forward speed drives including a low speed drive, and fluid-pressure controlled servo-mechanism for actuating said drive-mechanism to activate said forward speed drives other than said low speed drive and to inactivate low speed drive; a manual selector-lever movably settable in a first, a second, and a third position, said drive-mechanism being in a neutral non-driving condition when said lever is in its said first position and the setting of said lever in its said second position manually activating low speed drive; a pedal having an operating range of movement between two extremes; control means including valving means responsive to movement of said pedal for actuating said servo-mechanism; a control element movable with said selector-lever to its said third position for rendering said *control means effective to cause actuation of said* servo-mechanism [effective] to establish said other speed drives in response to movement of said pedal between its extremes, said low speed drive also being [actuatable manually] *utilizable as a drive* upon [direct] manual movement of said selector-lever from its [first] *second* to its third position; the reinstatement of low speed drive, following servo-mechanism inactivation thereof with said selector-lever in its third position, requiring a return of said selector-lever from its third to its first position and consequent repositioning of said selector-lever in its second [or its third] position[s], as aforesaid.

81. In change-speed transmissions having drive-mechanism actuatable to activate and inactivate low, intermediate and high speed forward drives, and fluid-pressure controlled servo-mechanism for actuating said drive-mechanism to inactivate low speed drive and activate intermediate and high speed drives; a pedal having an operating range of movement between two extremes; a selector-lever manually settable in a first position at which said drive mechanism is in a neutral non-driving condition, in a second position at which said drive-mechanism is manually *actuated* [activated] to activate low speed drive, and in a third position, and with movement of said selector-lever from its [first] *second* to its third position [causing activation] *enabling utilization* of low speed drive during an operating movement of said pedal within its extremes; control valving means controlled by said pedal and effective to [inactivate] *cause inactivation of* said low speed drive by operation of said servo-mechanism; drive selective control means [effective] *operable* to predetermine sequential activation of intermediate and high speed drives; *operating means for said selective control means;* a control element movable with said selector-lever when moved to its third position for rendering said control valving means effective to cause operation of said servo-mechanism in response to operation of said pedal, whereby low speed *is utilizable as a* drive [is obtainable] in both said second and said third positions of said selector-lever, and intermediate and high speed drives are obtainable only in the third position setting of said selector-lever, said drive selective control means being [effective] *operable* to cause alternate activation of intermediate and high speed drives solely [upon] *in response to* pedal actuation with said selector lever in its third position; the reinstatement of low speed *as a* drive after servo-mechanism inactivation thereof necessitating return cyclic movement of said selector-lever to its said first position and thence to [another of] its *second* position[s] [to] *whereby said drive-mechanism is* manually *actuated to* activate low speed drive.

82. In change-speed transmissions having drive-mechanism actuatable to activate low, intermediate, and high speed forward drives, and fluid-pressure energizable servo-mechanism for actuating said drive-mechanism; a source of pressure-fluid; a pedal having different ranges of operating movement between two extremes; a manual selector-lever movably settable from a first into a second position to cause actuation of said drive-mechanism to activate the low speed; control means including valving means controlled by said pedal, and effective to cause energization of said servo-mechanism; drive governing means operable to predetermine sequential inactivation of the low speed and activation of intermediate and high speeds by said servo-mechanism; a plurality of control elements actuated coincidentally with the aforesaid activation of the low speed for rendering said governing means operative and the servo-mechanism energizable, said control means being effective to cause servo-transition from low to intermediate to high speed drive in accordance with the aforesaid functioning of said governing means in response to a first range movement followed by successive movements to one of the extremes of said pedal without displacing said selector-lever out of its second position setting.

83. In a change-speed gear transmission, a driving shaft, a driven shaft, a plurality of gear trains for connecting said shafts in variant relative forward driving speed relation and including an element shiftable to establish a low speed drive, and also shiftable to a neutral position, manually-operable means for shifting said element, fluid-pressure energized means for selectively rendering said low speed drive ineffective, and at least two higher speed drives effective at will, a source of pressure-fluid, speed drive governing means including a pedally-controlled valve for supplying pressure-fluid to energize said fluid-pressure means, and means effective by said establishing of low speed drive to condition said govrening means to function to selectively operate said speed drives in the manner stated.

84. In a change-speed gear transmission, a driving shaft, a driven shaft, a plurality of gear trains for connecting said shafts in variant relative forward driving speed relation, and in reverse driving speed relation and including an element shiftable to establish a forward low speed drive, and also shiftable to establish said reverse speed drive and to a neutral position, manually-operable means for shifting said element, fluid-pressure energized means for selectively rendering said low speed drive ineffective, and at least two higher speed drives effective at will, a source of pressure-fluid, speed drive governing means including a pedally-controlled valve for supplying pressure-fluid to energize said fluid-pressure means, means effective by said establishing of low speed drive for conditioning said governing means to selectively operate said speed drives in the manner stated, and means operable to render said governing means ineffective when said manually-operable means shifts said element to establish said reverse speed drive, or to its neutral position.

85. In change-speed drive systems having means for transmitting and interrupting drive-torque to drive-mechanism actuatable to activate low, intermediate, and high speed forward drives, and fluid pressure energizable servo-mechanism for actuating said drive mechanism; a source of pressure-fluid; a pedal having a range of operating movement defined by two extremes and operable to control said drive-torque means; a manual selector-lever movably settable from a first into a second position to cause actuation of said drive-mechanism to activate the low speed upon said pedal being operated to one of its extremes to interrupt said drive-torque; control means including valving means controlled by said pedal, and effective to cause energization of said servo-mechanism; drive governing means operable to predetermine sequential inactivation of the low speed and activation of the intermediate and high speeds by said servo-mechanism; *means for operating said governing means;* a plurality of control elements actuated coincidentally with the aforesaid activation of the low speed for rendering said governing means operative and the servo-mechanism energizable, said control means being effective to cause servo-transition from low speed to intermediate speed drive prior to effective drive-torque being transmitted by said low speed drive according to the functioning of said governing means in response to successive cyclic operations of said pedal from one extreme to the other and return, without displacing said selector-lever out of its second position setting.

86. A change-speed drive system according to claim 85 including means operable by a cyclic movement of said manually-operable selector-lever from second position setting to first position and *during* return to cause actuation of said drive-mechanism to reactivate low speed drive.

87. In change-speed transmissions having drive-mechanism actuatable to activate and inactivate a low, intermediate, and a high speed forward drive; fluid-pressure energizable servo-mechanism including a [pedally-controlled] *fluid-control* element *operable to a plurality of fluid-control positions* for actuating said drive-mechanism [, said], *a* pedal having an operating range of movement between two extremes *for controlling said fluid-control element*; a source of pressure-fluid; manual-selector means movably settable from a first to a second and to a third position including a *fluid*-control element movable therewith *to corresponding fluid-control positions* for [supplying] *controlling* pressure-fluid from said source to said [pedally-controlled] *first-named fluid-control and* element, said selector means when moved from first to second position while said pedal is in an extreme position causing actuation of said drive-mechanism to activate low speed drive, and when moved from second to third position *with said pedally-controlled element operated to one of its fluid-control positions*, without restricting said pedal operation to an extreme position, causing servo-transition from low to intermediate speed drive; selective drive governing means operable for predetermining actuation of said drive-mechanism by said servo-mechanism *to activate intermediate and high speed drives, said governing means normally selecting intermediate speed drive to enable the aforesaid transition from low speed drive thereto*; operating means for said governing means; said servo-mechanism being *operatively* energizable in response to correlated operations of said [pedally-controlled element] *pedal operated to a different fluid-control position* and *said* governing means *operated by its operating means to select high speed drive* to cause servo-transition from intermediate to high speed drive, and thereafter alternately therebetween without displacing said selector means out of its third position setting.

88. A change-speed transmission according to claim 87 including means operable by a cyclic movement of said selector means from third position to first and return *to said second position* for causing actuation of said drive-mechanism to reactivate said low speed drive.

89. A change-speed transmission according to claim 87 wherein movement of said manual-selector means from third to first position is effective to inactivate an activated speed drive, and coincidentally render said servo-mechanism non-energizable.

*90. In change-speed transmissions having drive-mechanism comprising actuatable gear sets for controlling low speed forward drive operation, and intermediate and high speed forward drive operations: fluid-pressure controlled servo-mechanism operatively energizable for actuating said gear sets; a source of pressure-fluid production connectable to said servo-mechanism for operatively energizing the same; means for operatively connecting said servo-mechanism with said gear sets; control valve means including a movable fluid-control element for selectively connecting said source to said servo-mechanism to cause actuation of said gear sets to neutralize low speed operation, and render intermediate and high speed operations selectively effective; a pedal having an operating range of movement defined by two extreme positions for operatively controlling said control valve means; manual-selector means movably settable from a neutral position to a first and a second forward drive controlling position including a fluid-control element movable therewith to operating positions for controlling the supply of pressure-fluid from said source to said control valve means to render the latter effective when operated to cause said servo-mechanism to be operatively energized; means operatively connecting the manual-selector with the low speed drive gear set whereby low speed operation is rendered effective as a drive in response to movement of the manual-selector from neutral to first controlling position with said pedal operated into one of its extreme positions; selecting means including operating means therefor for controlling servo-operation of intermediate and high speed drive gear sets; and means for effecting operative coaction between the said pedal and first-named fluid control element in response to a cyclic movement of said pedal to and from said one extreme position, to enable subsequent pedal-movements of said first-named fluid-control element to cause said servo-mechanism to be operatively fluid-energized for sequentially actuating the gear sets of low and intermediate speed drives to neutralize low speed operation and render said intermediate speed operation effective as a drive, respectively, with the selecting means operated to control intermediate speed operation and the manual-selector moved from first to second controlling position.*

*91. A change-speed transmission drive-mechanism as defined in claim 90 including means operable in response to a subsequent operation of said pedal with the selecting means operated to control high speed drive operation, and the manual-selector in second controlling position, for causing said servo-mechanism to be operatively fluid-energized to actuate the gear sets of inter-*

*mediate and high speed drives to render the same ineffective and effective, respectively, as a drive.*

*92. A change-speed transmission drive-mechanism as defined in claim 91 in which the servo-mechanism is operatively fluid-energizable to actuate the gear sets of intermediate and high speed drives after high speed drive operation has been rendered effective as a drive, to render these two drive operations alternately effective as a drive in response to operating said pedal with said selecting means operated to selectively control operation of said two drives and the manual-selector in second controlling position.*

*93. In a control mechanism for a change-speed transmission having a power train for providing at least three different forward speed drives and manually-controlled means including a shift-lever movable to three positions whereby one speed drive of said power train is rendered operative by moving said shift-lever from one position to another position, power operated means comprising control means for causing the two other speed drives to be alternately rendered operative upon movement of said shift-lever to its third position, and means effective upon rendering said one speed drive operative for conditioning said control means to control operation of said power-operated means, when operated by said control means said power-operated means rendering in-*

*operative said one speed drive and rendering operative the two remaining speed drives without causing movement of said shift-lever by said power-operated means from its third position setting.*

GLENN T. RANDOL.

References Cited in the file of this patent

UNITED STATES PATENTS

| Number | Name | Date |
|---|---|---|
| 1,998,274 | Drabin | Apr. 16, 1935 |
| 2,126,032 | Randol | Aug. 9, 1938 |
| 2,163,883 | Kliesrath | June 27, 1939 |
| 2,177,662 | Kliesrath et al. | Oct. 31, 1939 |
| 2,187,824 | Britton | Jan. 23, 1940 |
| 2,208,828 | Adams | July 23, 1940 |
| 2,227,412 | Stortz | Dec. 31, 1940 |
| 2,263,400 | Schwarz | Nov. 18, 1941 |
| 2,282,591 | Orr | May 12, 1942 |
| 2,351,067 | Randol | June 13, 1944 |
| 2,360,976 | Peterson et al. | Oct. 24, 1944 |
| 2,394,580 | Banker | Feb. 12, 1946 |
| 2,430,799 | Aspinwall | Nov. 11, 1947 |

FOREIGN PATENTS

| Number | Country | Date |
|---|---|---|
| 321,067 | Italy | Sept. 26, 1934 |

UNITED STATES PATENT OFFICE

CERTIFICATE OF CORRECTION

Reissue No. 23,696

August 4, 1953

Glenn T. Randol

It is hereby certified that error appears in the printed specification of the above numbered patent requiring correction and that the said Letters Patent should read as corrected below.

Column 19, line 2, for "pins 35" read --pin 35--; column 30, line 73, for "set manually-controlled" read --set, manually-controlled--; column 32, line 58, for "elements" read --element--; column 33, line 75, after "clutch" and before the comma insert --actuatable by a clutch pedal--; column 34, lines 64 and 65, strike out the italicized expression "including a shift-lever movable to two positions," and insert the same after "means" in line 65, same column; column 37, line 6, for "gear sets" read --connection--; line 9, for "gearing" read --device--; line 29, for "drive" read --drives--; line 66, after "said" insert --last-named--; column 40, line 13, before "and a" strike out the italicized word "operatively" and insert the same before "change", same line; column 41, line 17, after "drives" insert a comma; line 64, for "connection by said" read --connection of said--; column 46, line 57, strike out "said manual action or movement otherwise of"; column 57, line 3, for "transmission" read --transmissions--; column 58, line 49, for "govrening" read --governing--; column 59, line 54, strike out the italicized word "and".

Signed and sealed this 8th day of March, 1955.

(SEAL)
Attest:

E. J. MURRY
Attesting Officer

ROBERT C. WATSON
Commissioner of Patents